(12) United States Patent
Mochiyama et al.

(10) Patent No.: US 8,763,736 B2
(45) Date of Patent: Jul. 1, 2014

(54) CONTROL APPARATUS AND METHOD FOR HYBRID VEHICLE

(75) Inventors: Shinya Mochiyama, Fuji (JP); Hiroki Kawakami, Fuji (JP); Hideharu Yamamoto, Fujinomiya (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/281,990

(22) Filed: Oct. 26, 2011

(65) Prior Publication Data

US 2012/0103709 A1   May 3, 2012

(30) Foreign Application Priority Data

Nov. 2, 2010 (JP) ................................ 2010-245826

(51) Int. Cl.
*B60W 20/00* (2006.01)
(52) U.S. Cl.
USPC ............... 180/65.21; 180/65.265; 180/65.22; 180/338; 477/5; 477/34; 475/136
(58) Field of Classification Search
USPC ............. 180/65.21, 65.22, 65.265, 65.275; 475/136, 137; 477/34, 115, 156, 5; 701/58; 417/36, 297.5, 279; 137/14, 137/565.33, 565.16
See application file for complete search history.

(56) References Cited

U.S. PATENT DOCUMENTS

| | | | |
|---|---|---|---|
| 5,361,213 A * | 11/1994 | Fujieda et al. ................ | 701/111 |
| 5,697,479 A | 12/1997 | Kono et al. | |
| 5,800,308 A | 9/1998 | Tsutsui et al. | |
| 5,871,419 A | 2/1999 | Amendt | |
| 5,916,058 A | 6/1999 | Sakai et al. | |
| 5,944,632 A * | 8/1999 | Hara et al. ................ | 477/158 |
| 6,022,295 A | 2/2000 | Liu | |
| 6,033,340 A | 3/2000 | Amendt et al. | |
| 6,033,342 A | 3/2000 | Steinel et al. | |
| 6,110,072 A * | 8/2000 | Harada et al. ................ | 477/157 |
| 6,135,919 A | 10/2000 | Shimakura | |
| 6,253,137 B1 * | 6/2001 | Abo et al. ................ | 701/51 |

(Continued)

FOREIGN PATENT DOCUMENTS

EP    1 972 833 A2    9/2008
JP    60-136662 A    7/1985

(Continued)

OTHER PUBLICATIONS

U.S. Appl. No. 13/281,939, filed Oct. 26, 2011, Nagashima et al.

(Continued)

*Primary Examiner* — J. Allen Shriver, II
*Assistant Examiner* — Steve Clemmons
(74) *Attorney, Agent, or Firm* — Foley & Lardner LLP

(57) ABSTRACT

In control apparatus and method for a hybrid vehicle, a line pressure control valve disposed at a downstream side of each of mechanical oil pump (M-O/P) and electrically driven oil pump (S-O/P) to decrease a supplied hydraulic pressure from at least one of the mechanical oil pump and the electrically driven oil pump by opening drain ports thereof in accordance with a control valve command value is provided, the control valve command value is set by adding a predetermined additive correction quantity to a required line pressure set in accordance with operating states of a hydraulic pressure clutch (CL1) and a transmission and the drain ports of the line pressure control valve are controlled to a closure side, during an actuation of the electrically driven oil pump.

10 Claims, 11 Drawing Sheets

(56) References Cited

U.S. PATENT DOCUMENTS

| | | | |
|---|---|---|---|
| 6,494,810 B1 | 12/2002 | Mack et al. | |
| 6,527,672 B1 * | 3/2003 | Schuler et al. | 477/125 |
| 6,565,473 B2 * | 5/2003 | Endo et al. | 475/117 |
| 6,602,160 B2 * | 8/2003 | Tsutsui | 477/44 |
| 6,658,341 B2 | 12/2003 | Inoue et al. | |
| 6,769,502 B2 * | 8/2004 | Nakamori et al. | 180/65.25 |
| 7,089,095 B2 | 8/2006 | Takami et al. | |
| 7,226,383 B2 | 6/2007 | Namba | |
| 7,359,785 B2 | 4/2008 | Yoshida et al. | |
| 7,404,460 B2 * | 7/2008 | Oshidari | 180/65.235 |
| 7,465,250 B2 * | 12/2008 | Tamai et al. | 477/3 |
| 7,610,891 B2 | 11/2009 | Seufert et al. | |
| 7,730,982 B2 | 6/2010 | Hidaka et al. | |
| 7,828,096 B2 * | 11/2010 | Hoher et al. | 180/65.6 |
| 8,037,858 B2 | 10/2011 | Seufert et al. | |
| 8,108,115 B2 | 1/2012 | Kobayashi et al. | |
| 8,170,762 B2 | 5/2012 | Foster et al. | |
| 8,187,151 B2 | 5/2012 | Gloge | |
| 8,216,112 B2 * | 7/2012 | Gibson et al. | 477/156 |
| 8,297,249 B2 | 10/2012 | Seufert et al. | |
| 8,393,998 B2 | 3/2013 | Akebono et al. | |
| 2002/0107103 A1 * | 8/2002 | Nakamori et al. | 475/116 |
| 2004/0157704 A1 | 8/2004 | Stork et al. | |
| 2005/0102082 A1 * | 5/2005 | Joe et al. | 701/54 |
| 2005/0215393 A1 * | 9/2005 | Shimoda | 477/44 |
| 2005/0222735 A1 * | 10/2005 | Usuki et al. | 701/51 |
| 2007/0142142 A1 * | 6/2007 | Yamaguchi et al. | 474/28 |
| 2007/0204817 A1 * | 9/2007 | Russell et al. | 123/90.12 |
| 2008/0011529 A1 * | 1/2008 | Hoher et al. | 180/65.2 |
| 2008/0017427 A1 | 1/2008 | Nakanowatari | |
| 2008/0220937 A1 * | 9/2008 | Nozaki et al. | 477/86 |
| 2009/0112423 A1 * | 4/2009 | Foster et al. | 701/60 |
| 2009/0143189 A1 | 6/2009 | Hasegawa et al. | |
| 2010/0018808 A1 * | 1/2010 | Gloge | 184/6.12 |
| 2010/0056328 A1 | 3/2010 | Schenk et al. | |
| 2010/0197451 A1 | 8/2010 | Kaltenbach et al. | |
| 2010/0204862 A1 * | 8/2010 | Uejima et al. | 701/22 |
| 2011/0082630 A1 | 4/2011 | Kawaguchi et al. | |
| 2011/0256978 A1 | 10/2011 | Falkenstein | |
| 2011/0276207 A1 | 11/2011 | Falkenstein | |
| 2012/0105925 A1 | 5/2012 | Shirai et al. | |
| 2012/0108388 A1 | 5/2012 | Akebono et al. | |
| 2012/0109438 A1 | 5/2012 | Akebono et al. | |
| 2012/0109439 A1 | 5/2012 | Akebono et al. | |
| 2012/0203406 A1 | 8/2012 | Akebono et al. | |
| 2013/0218391 A1 | 8/2013 | Aizawa et al. | |
| 2013/0218392 A1 | 8/2013 | Aizawa et al. | |

FOREIGN PATENT DOCUMENTS

| | | |
|---|---|---|
| JP | 2000-170888 A | 6/2000 |
| JP | 2001-018690 A | 1/2001 |
| JP | 2010-179860 A | 8/2010 |
| JP | 2010-195363 A | 9/2010 |

OTHER PUBLICATIONS

U.S. Appl. No. 13/283,991, filed Oct. 28, 2011, Akebono et al.
U.S. Appl. No. 13/283,938, filed Oct. 28, 2011, Akebono et al.
U.S. Appl. No. 13/283,974, filed Oct. 28, 2011, Akebono et al.
U.S. Appl. No. 13/283,954, filed Oct. 28, 2011, Akebono et al.
U.S. Appl. No. 13/283,909, filed Oct. 28, 2011, Mochiyama et al.
U.S. Appl. No. 13/361,640, filed Oct. 30, 2012, Akebono et al.
H. Akebono, U.S. PTO Office Action, U.S. Appl. No. 13/283,991, dated Mar. 14, 2013, 10 pages.
H. Akebono, U.S. PTO Notice of Allowance, U.S. Appl. No. 13/283,974, dated Nov. 23, 2012, 13 pages.
H. Akebono, U.S. PTO Notice of Allowance, U.S. Appl. No. 13/283,938, dated Dec. 28, 2012, 14 pages.
S. Mochiyama, U.S. PTO Office Action, U.S. Appl. No. 13/283,909, dated May 3, 2012, 12 pages.
H. Akebono, U.S. PTO Office Action, U.S. Appl. No. 13/283,954, dated Jul. 9, 2013, 28 pages.
H. Akebono, U.S. PTO Notice of Allowance, U.S. Appl. No. 13/283,991, dated Jul. 9, 2013, 10 pages.
H. Akebono, U.S. PTO Notice of Allowance, U.S. Appl. No. 13/283,954, dated Dec. 23, 2013, 14 pages.
S. Mochiyama, U.S. PTO Notice of Allowance, U.S. Appl. No. 13/283,909, dated Dec. 27, 2013, 12 pages.
H. Akebono, U.S. PTO Notice of Allowance, U.S. Appl. No. 13/361,640, dated Oct. 30, 2013, 20 pages.
S. Mochiyama, U.S. PTO Office Action, U.S. Appl. No. 13/283,909, dated Sep. 10, 2013, 9 pages.
F. Nagashima, U.S. PTO Notice of Allowance, U.S. Appl. No. 13/281,939, dated Sep. 23, 2013, 19 pages.

* cited by examiner

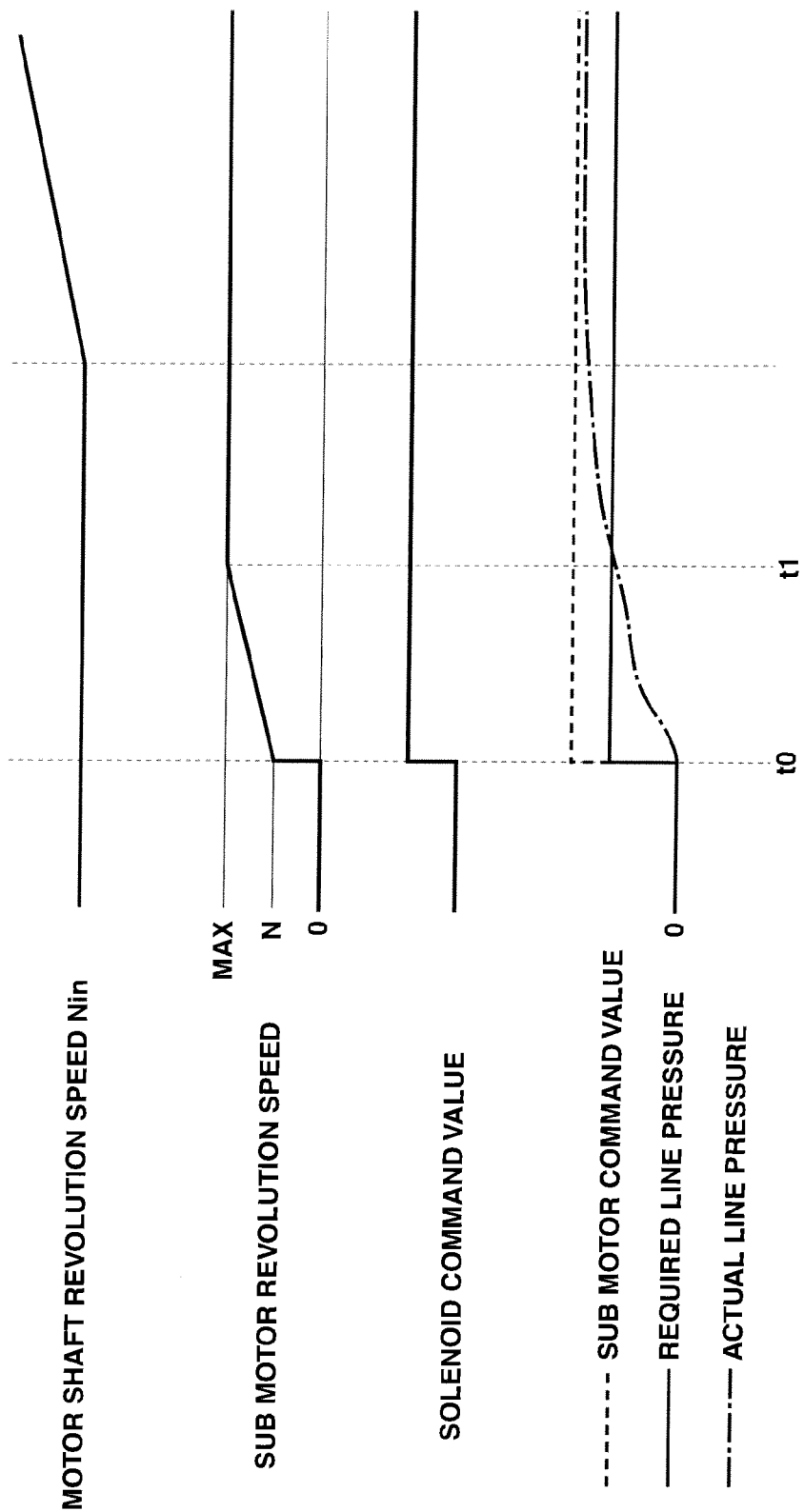

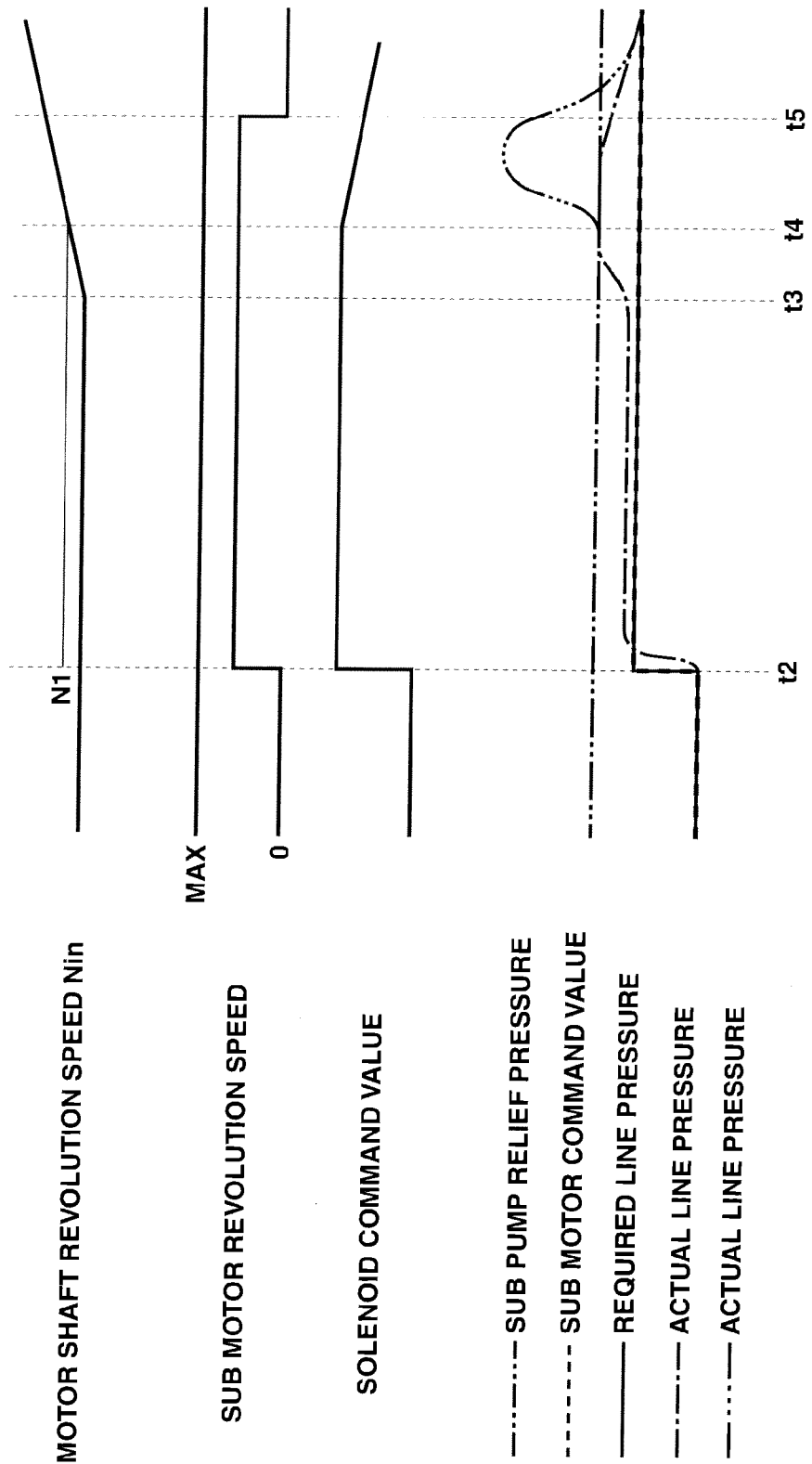

CONTROL APPARATUS AND METHOD FOR HYBRID VEHICLE

BACKGROUND OF THE INVENTION (1) Field of the Invention

The present invention relates to control apparatus and method for a hybrid vehicle which control a line pressure regulator valve, the line pressure regulator valve regulating a line pressure of a hybrid (vehicle) drive train.

(2) Description of Related Art

A Japanese Patent Application First Publication No. 2010-179860 published on Aug. 19, 2010 exemplifies a previously proposed control apparatus for a hybrid vehicle. In details, in the hybrid vehicle, connections are made in such a sequence as an engine, a first clutch, a motor/generator, a transmission, and driving wheels to constitute the hybrid drive train. The first clutch is a hydraulic pressure clutch whose engagement and release (open) are controlled in response to a hydraulic pressure of a working oil and the transmission is gear shift controlled in response to the working oil hydraulic pressure. In such a hybrid vehicle as described above, a required hydraulic pressure supply is basically carried out using a mechanical oil pump (hereinafter, abbreviated as mecha O/P) actuated through a motor shaft. In addition, when a discharge pressure from the mecha O/P becomes insufficient during an EV mode in which the vehicle is traveling, with only the motor/generator as a driving source, or during a vehicle stop, the hydraulic pressure supply is carried out using an electrically driven oil pump (hereinafter, abbreviated as an electrically driven O/P) actuated by mans of a sub motor. It should, herein, be noted that electrically driven O/P is controlled using a torque control method in which the discharge pressure from electrically driven O/P is controlled by means of a specified hydraulic pressure (torque). It is possible to use the discharge pressure from electrically driven O/P without waste by adopting the torque control method.

SUMMARY OF THE INVENTION

Incidentally, in the previously proposed hybrid vehicle, mecha O/P and electrically driven O/P which are hydraulic pressure sources are juxtaposed to each other and flapper valves, each of the flapper valves being opened when the discharge pressure is equal to or larger than a predetermined value, are installed in respective drain passages of mecha O/P and electrically driven O/P. Then, oil passages at downstream sides of the respective flapper valves are combined into a single oil passage in which a line pressure control valve (a line pressure regulator valve) is installed.

This line pressure control valve is provided with a drain port which is ordinarily closed. The drain port is opened in response to a signal pressure outputted from a line pressure solenoid according to a command pressure so that a pump pressure (a source pressure) is drained to regulate the line pressure to conform to the command pressure.

However, in a case where a characteristic such that an actual line pressure becomes lower than the command pressure is provided due to a mechanical dispersion of parts constituting the line pressure control valve, the drain port is opened before the actual line pressure reaches to the specified hydraulic pressure so that a pump pressure is often drained.

On the other hand, during the operation of electrically driven O/P, the discharge pressure from electrically driven O/P is controlled through the specified hydraulic pressure (torque). Therefore, when the pump pressure from the line pressure control valve is drained to reduce the line pressure, a load of electrically driven O/P is reduced so that the revolution speed of a sub motor which actuates electrically driven O/P is raised. Furthermore, even if the sub motor revolution speed indicates a maximum revolution speed, the drain from the line pressure control valve is continued. Hence, the torque at electrically driven O/P is not balanced. This causes the sub motor revolution speed to be maintained at a high revolution speed state. Thus, the generation of high-frequency noises from the sub motor and a shortening of a life span of the sub motor due to the continuation of the high-speed driving occurs. Furthermore, the rise of the line pressure due to the drain from the line pressure control valve is delayed and such a problem as the reduction in a line pressure control accuracy and a worsening of a fuel consumption occurs.

It is, hence, an object of the present invention to provide control apparatus and method for a hybrid vehicle which are capable of achieving improvements in the line pressure control accuracy, in fuel consumption, in noise reduction, and in durability by suppressing the rise in the revolution speed of the sub motor actuating the electrically driven oil pump (electrically driven O/P) during the operation of electrically driven oil pump.

According to one aspect of the present invention, there is provided a control apparatus for a hybrid vehicle, comprising: an engine; a motor; a hydraulic pressure clutch interposed between the engine and the motor to perform an engagement thereof and an open thereof; a transmission interposed between the motor and driving wheels to perform a change in at least one of a gear shift stage and a transmission gear ratio according to a hydraulic pressure; a mechanical oil pump actuated by means of at least one of the engine and the motor to perform a hydraulic pressure supply; an electrically driven oil pump actuated by means of a sub motor to perform the hydraulic pressure supply; a line pressure control valve disposed at a downstream side of each of the mechanical oil pump and the electrically driven oil pump to decrease the supplied hydraulic pressure from at least one of the mechanical oil pump and the electrically driven oil pump by opening drain ports thereof in accordance with a control valve command value; and a line pressure control section configured to set the control valve command value by adding a predetermined additive correction quantity to a required line pressure set in accordance with operating states of the hydraulic pressure clutch and the transmission and to control the drain ports of the line pressure control valve to a closure side, during an actuation of the electrically driven oil pump.

According to another aspect of the present invention, there is provided a control method for a hybrid vehicle, the hybrid vehicle comprising: an engine; a motor; a hydraulic pressure clutch interposed between the engine and the motor to perform an engagement thereof and an open thereof; a transmission interposed between the motor and driving wheels to perform a change in at least one of a gear shift stage and a transmission gear ratio according to a hydraulic pressure; a mechanical oil pump actuated by means of at least one of the engine and the motor to perform a hydraulic pressure supply; and an electrically driven oil pump actuated by means of a sub motor to perform the hydraulic pressure supply, the control method comprising: providing a line pressure control valve disposed at a downstream side of each of the mechanical oil pump and the electrically driven oil pump to decrease the supplied hydraulic pressure from at least one of the mechanical oil pump and the electrically driven oil pump by opening drain ports thereof in accordance with a control valve command value; and setting the control valve command value by adding a predetermined additive correction quantity to a required line pressure set in accordance with operating states of the hydraulic pressure clutch and the transmission and controlling the drain ports of the line pressure control valve to a closure side, during an actuation of the electrically driven oil pump.

BRIEF DESCRIPTION OF THE DRAWINGS

FIG. 12 is a timing chart representing each characteristic of the motor shaft revolution speed, sub motor revolution speed, solenoid command value, required line pressure, and actual line pressure, in a line pressure control at a time of operation of the electrically driven oil pump in a comparative example.

FIG. 14 is a timing chart representing each characteristic of the motor shaft revolution speed, sub motor revolution speed, solenoid command value, required line pressure, and actual line pressure at a time of operation in the electrically driven oil pump in the preferred embodiment shown in FIG. 1.

DETAILED DESCRIPTION OF THE INVENTION

Hereinafter, a preferred embodiment of a control apparatus for a hybrid vehicle will be described with reference to the accompanied drawings in order to facilitate a better understanding of the present invention.

Figure 1:
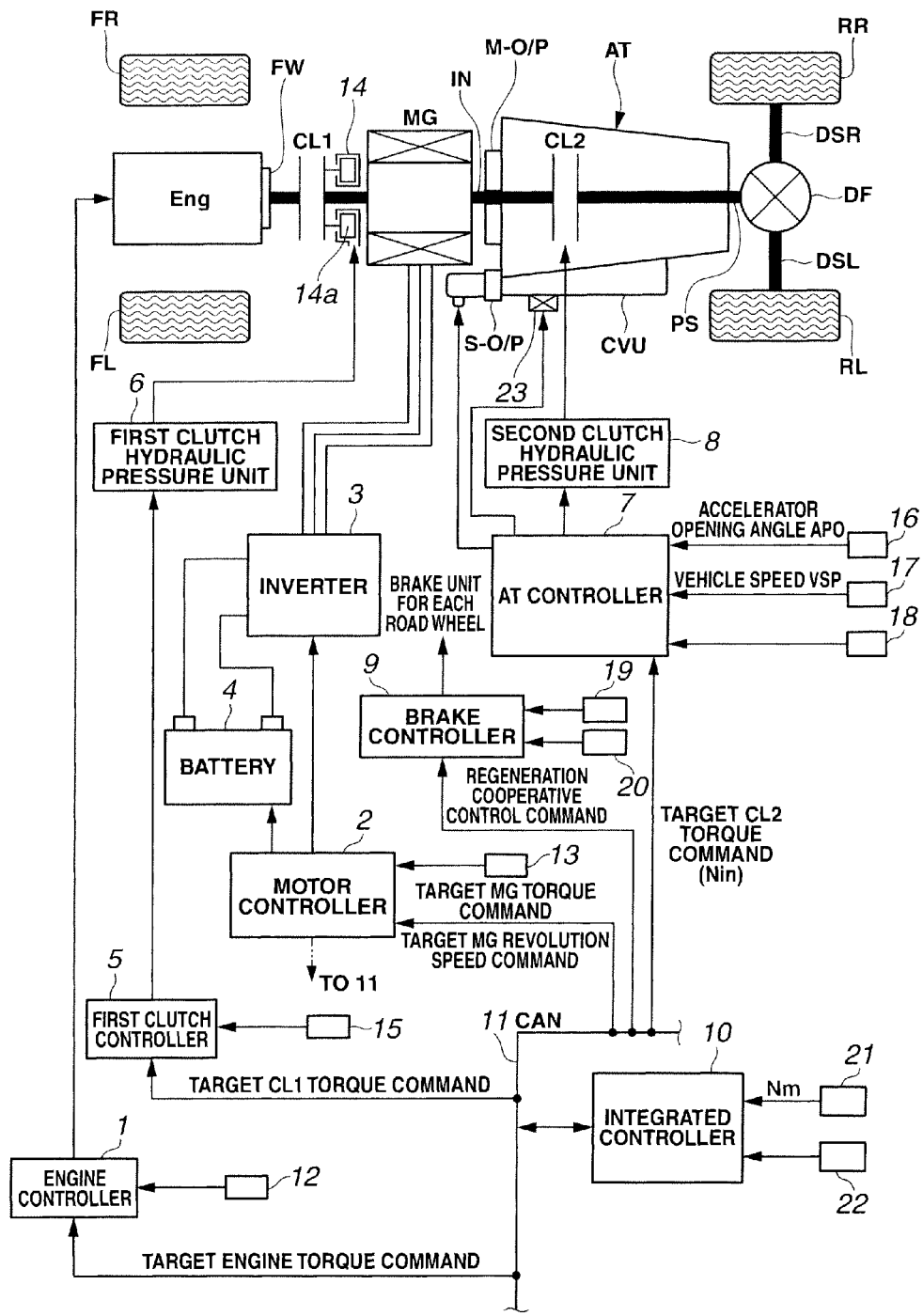
FIG. 1 is a system configuration view representing a front-engine rear-wheel drive (FR) hybrid vehicle (one example of the hybrid vehicle) to which a control apparatus in a preferred embodiment according to the present invention is applicable.

First, a structure of the preferred embodiment will be described. FIG. 1 shows a whole system configuration of an FR hybrid vehicle to which the embodiment of the control apparatus according to the present invention is applicable.

A drive train of an FR (front engine rear wheel drive) hybrid vehicle, in the embodiment, as shown in FIG. 1, includes: an engine Eng; a flywheel FW; a first clutch CL1 (hydraulic pressure clutch); a motor/generator MG (motor); a second clutch CL2; an automatic transmission AT (transmission); a transmission input shaft IN; a mechanical (mecha) oil pump M-O/P (mechanical oil pump); a sub oil pump S-O/P (electrically driven oil pump); a propeller shaft PS; a differential DF; a left drive shaft DSL; a right drive shaft DSR; a left rear road wheel RL (driving wheel); and a right rear road wheel RR (driving wheel) RR. It should be noted that, in FIG. 1, FL denotes a front left road wheel and FR denotes a front right road wheel.

Engine Eng is constituted by a diesel engine or gasoline engine. An engine start control, an engine stop control, a valve opening angle control of a throttle valve, a fuel cut-off control, and so forth are carried out on a basis of an engine control command from an engine controller 1. It should be noted that flywheel FW is installed on an engine output shaft.

First clutch CL1 is a hydraulic pressure clutch interposed between engine Eng and motor/generator MG and whose engagement, half-engagement state, and release (open) are controlled in response to a first clutch control hydraulic pressure produced by a first clutch hydraulic pressure unit 6 on a basis of a first clutch control command from a first clutch controller 5. As first clutch CL1, a normal close dry type single-plate clutch is, for example, used in which a complete engagement thereof, a slip engagement thereof, and a complete release (open) thereof are controlled according to a stroke control using a hydraulic pressure actuator 14 having a piston 14a, the complete engagement being maintained according to a biasing force by means of a diaphragm spring.

Motor/generator MG is a synchronous type motor/generator MG in which permanent magnets are buried on a rotor and a stator coil is wound on a stator. A three-phase alternating current produced by an inverter 3 is applied to motor/generator MG on a basis of a control command from a motor controller 2. This motor/generator MG can be operated as an electric motor which is rotatably driven upon receipt of a power supply from a battery 4 (a power running or an acceleration) and, in a case where the rotor receives a revolution energy from engine Eng or the driving wheels, can function as a generator which generates an electromotive force across both ends of the stator coil so as to enable a charge of a battery 4 (regeneration). It should be noted that the rotor (motor shaft) of this motor/generator MG is coupled with a transmission input shaft IN of an automatic transmission AT. It should also be noted that motor controller 2 calculates a motor shaft revolution speed Nin from an output signal from resolver 13 and supplies the calculated motor shaft revolution speed to AT controller 7 via CAN communication line 11. It should, furthermore, be noted that motor shaft revolution speed Nin calculated by motor controller 2 may correspond to motor revolution speed Nm detected by a motor revolution speed sensor 21.

Second clutch CL2 is the hydraulic pressure clutch interposed between motor/generator MG and left and right rear road wheels (driving wheels) RL, RR and whose engagement, the slip engagement, and release (open) are controlled according to a control hydraulic pressure produced by a second clutch hydraulic pressure unit 8 on a basis of a second clutch control command from AT controller 7. As this second clutch CL2, a normal open wet-type multiple plate clutch or a wet-type multiple plate brake whose oil flow quantity and hydraulic pressure can continuously be controlled through a proportional solenoid is used. It should be noted that first clutch hydraulic pressure unit 6 and second clutch hydraulic pressure unit 8 are incorporated into a hydraulic pressure control valve unit CVU attached onto an automatic transmission AT.

Automatic transmission AT is a stepped gear transmission which automatically switches gear shift stages at a limited stage in accordance with a vehicle speed, an accelerator opening angle, and so forth and, in this embodiment, is the stepped gear transmission having a forward-seventh-speed-and-reverse-first-speed-gear-shift stage. In addition, second clutch CL2 is not a newly added clutch as an exclusive-use clutch independently installed from automatic transmission AT but is selected from a clutch element (a multiple-plate clutch or a multiple-plate brake) which complies with a predetermined condition from among a plurality of clutch elements engaged at respective shift stages of automatic transmission AT.

The above-described mecha O/P is the pump actuated according to the revolution driving force of the output shaft of motor/generator MG and a gear pump, vane pump, or so forth is, for example, is used for this mecha O/P. A pump input gear is connected with a pump gear attached onto a transmission input shaft IN (=motor shaft) of automatic transmission AT linked with an output shaft of motor/generator MG via a chain.

Sub oil pump S-O/P is driven by a sub motor S-M (refer to FIG. 4) to suppress a reduction of hydraulic pressure when a discharge pressure from mecha oil pump M-O/P becomes insufficient. This sub oil pump S-O/P is disposed in a motor housing and so forth.

In addition, this mecha oil pump M-O/P and sub oil pump provide hydraulic pressure sources for producing a control pressure for each of first and second clutches CL1, CL2 and the control pressure for automatic transmission AT. In these hydraulic pressure sources, sub motor S-M is stopped and sub oil pump S-O/P is accordingly stopped when a discharge oil quantity from mecha O/P is sufficient. Sub motor S-M is driven to actuate sub oil pump S-O/P so as to be switched to perform a working oil discharge from this sub oil pump S-O/P as well when a drain hydraulic pressure from macha oil pump M-O/P is reduced. These actuation controls are executed by an AT controller 7 as will be described later.

Furthermore, a propeller shaft PS is linked with a transmission output shaft of automatic transmission AT. This propeller shaft PS is linked with left and right rear road wheels RL, RR via a differential DF, a left drive shaft DSL, and a right drive shaft DSR.

This FR hybrid vehicle includes: an electric vehicle mode (hereinafter, called "EV mode"), a hybrid vehicle mode (hereinafter, called "HEV mode"), and a drive torque control mode (hereinafter, called "WSC mode"), as traveling modes according to a difference in a driving mode.

The EV mode is the mode in which first clutch CL1 is in an open (released) state and the vehicle is traveling only through a driving force of motor/generator MG and is provided with a motor traveling mode and a regeneration traveling mode. This EV mode is basically selected when a required driving force is low and battery SOC is secured.

The HEV mode is the mode in which, with first clutch CL1 engaged, the vehicle is traveling and is provided with a motor assistance traveling mode, a power generation traveling mode, and an engine traveling mode. The vehicle is traveling in any one of these traveling modes. This HEV mode is basically selected when the required driving force is high or battery SOC is insufficient.

The WSC (Wet Start Clutch) mode is the mode in which the vehicle is traveling while a clutch torque capacity is controlled such that a clutch torque capacity passing second clutch CL2 indicates the required driving torque determined according to a vehicle state and an accelerator operation by the driver, while second clutch CL2 maintained at a slip engagement state according to a revolution speed control of motor/generator MG. This WSC mode is selected in a traveling region in which the engine speed is below the idling speed as in a case where the vehicle is stopped, started, and is decelerated under the selection state of the HEV mode.

Next, a control system of the FR hybrid vehicle will be explained below.

The control system of the FR hybrid vehicle in this embodiment, as shown in FIG. 1, includes: an engine controller 1; a motor controller 2; an inverter 3; a battery 4; a first clutch controller 5; a first clutch hydraulic pressure unit 6; an AT controller 7 (a line pressure control section (means)); second clutch hydraulic pressure unit 8; a brake controller 9; and an integrated controller 10. It should be noted that respective controllers 1, 2, 5, 7, 9 and integrated controller 10 are connected via a CAN (Controller Area Network) communication line 11 (communication line) which is capable of mutual information exchange.

Engine controller 1 inputs an engine (revolution) speed information from engine speed sensor 12, a target engine torque command from integrated controller 10, and other required information. Then, engine controller 1 outputs a command to control an engine operating point (Ne, Te) to a throttle valve actuator of engine Eng or so forth.

Motor controller 2 inputs the information from a resolver 13 for detecting a rotor rotary position of motor/generator MG, a target MG torque command and target MG revolution speed command from integrated controller 10, and other required information. Then, motor controller 2 outputs the command to control motor operating point (Nm, Tm) of motor/generator MG to inverter 3. It should be noted that this motor controller 2 monitors battery SOC representing a charge information of battery 4 and supplies this battery SOC (State Of Charge) information to integrated controller 10 via CAN communication line 11.

First clutch controller 5 inputs a sensor information from a first clutch stroke sensor 15 for detecting a stroke position of a piston 14a of a hydraulic pressure actuator 14, the target CL1 torque command from integrated controller 10, and any other required information. Then, first clutch controller 5 outputs the command to control the engagement, the half engagement, and open (release) of first clutch CL1 to first clutch hydraulic pressure unit 6 within hydraulic pressure control valve unit CVU.

Figure 2:
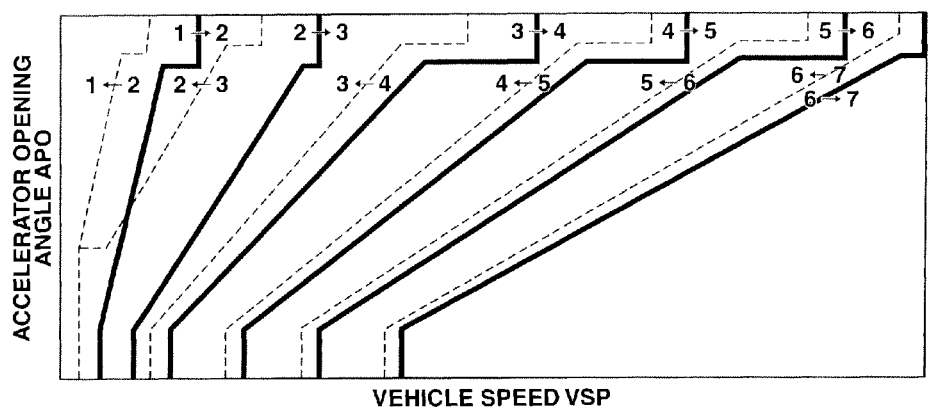
FIG. 2 is a map view representing an example of a shift map of an automatic transmission set in an AT controller in the preferred embodiment shown in FIG. 1.

AT controller 7 inputs sensor information from an accelerator opening angle sensor 16, a vehicle speed sensor 17, and other sensors (such as a working oil temperature sensor) 18. When the vehicle is traveling at the selection of "D" range, a driving point determined according to accelerator opening angle APO and vehicle speed VSP is used to search an optimum shift stage according to a position present on a shift map shown in FIG. 2 and a control command to achieve the searched shift stage is outputted to hydraulic pressure control valve unit CVU. The above-described shift map is the map on which up-shift lines and down-shift lines are written in accordance with accelerator opening angle APO and vehicle speed VSP as shown in FIG. 2.

In addition to this gear shift control, AT controller 7 performs a second clutch control in which a command to control the slip engagement for second clutch CL2 is outputted to second clutch hydraulic pressure unit 8 within hydraulic pressure control valve unit CVU in a case where a target CL2 clutch torque command is inputted from integrated controller 10. Furthermore, this AT controller 7 controls a line pressure PL which is a basic hydraulic pressure to operate a hydraulic pressure system of the hybrid drive train (first clutch CL1 and automatic transmission AT including second clutch CL2) through a line pressure solenoid 23.

Brake controller 9 inputs a sensor information from road wheel speed sensors 19 for detecting respective road wheel (revolution) speeds of four road wheels FR, FL, RR, RL and from brake stroke sensor 20, a regeneration cooperative control command from integrated controller 10, to and any other required information. For example, in a case where, during a brake (pedal)-depression braking, the required braking force cannot be achieved only by a regenerative braking force. In such a case as described above, brake controller 9 performs the regeneration is cooperative brake control. Hence, a lack of the required braking force from the regenerative braking force can be compensated for with a mechanical braking force (a liquid pressure braking force or a motor braking force).

Integrated controller 10 administrates a total energy consumption of a whole vehicle and plays a function to run the vehicle at a maximum efficiency. Integrated controller 10 inputs the required information from motor revolution speed sensor 21 detecting revolution speed Nm of motor/generator MG, the required information from other sensor and switches 22 and from CAN communication line 11. Then, integrated controller 10 outputs a target engine torque command to engine controller 1, target MG torque command and target MG revolution speed command to motor controller 2, the target CL1 torque command to first clutch controller 5, the target CL2 torque command to AT controller 7, the regenerative cooperation control command to brake controller 9.

Figure 3:
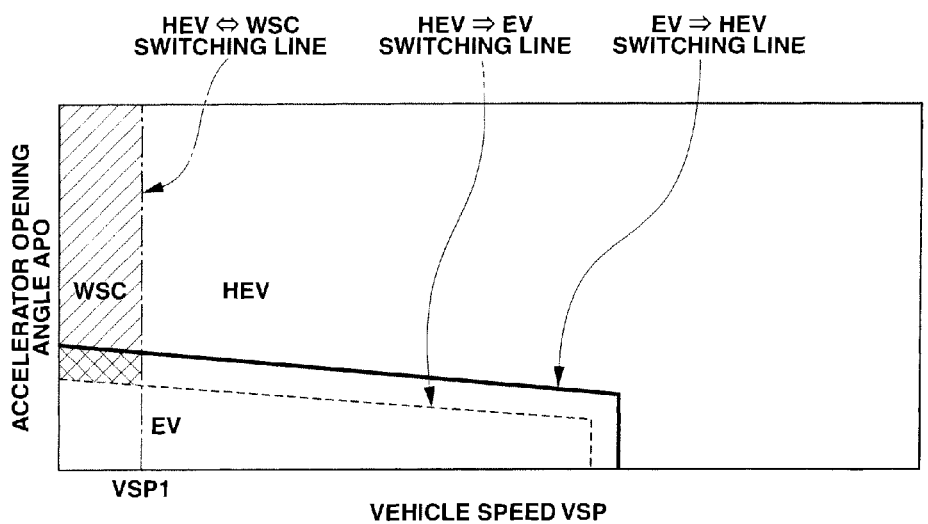
FIG. 3 is a map view representing one example of EV-HEV selection map set in a mode selection section of an integrated controller in the preferred embodiment shown in FIG. 1

This integrated controller 10 is provided with a mode selection section in which the driving point determined according to accelerator opening angle APO and vehicle speed VSP is used to search an optimum traveling mode according to a position present on an EV-HEV selection map shown in FIG. 3 and the searched traveling mode is selected as a target traveling mode. On this EV-HEV selection map, an EV ⇒ HEV switching line which switches the mode from the EV mode to the HEV mode when the driving point (APO, VSP) present in an EV region traverses this switching line, an HEV ⇒ EV switching line which switches the mode from the HEV mode to the EV mode when the driving point (APO, VSP) present in an HEV region transverses this switching line, and an HEV ⇔ WSC switching line which switches between the HEV mode and the WSC mode when the driving point (APO, VSP) transverse this switching line are set. It should be noted that the EV⇒ HEV switching line and the HEV⇒ EV switching line are set to have a hysterisis quantity as lines to divide the EV region and HEV region. The HEV⇔WSC switching line is set along a first set vehicle speed VSP1 at which engine Eng maintains the idling speed when automatic transmission AT is a first-speed range (1st speed). It should be noted that the target traveling mode is forcefully set to the HEV mode when battery SOC (State Of Charge) is equal to or below a predetermined value during the selection of the EV mode.

Figure 4:
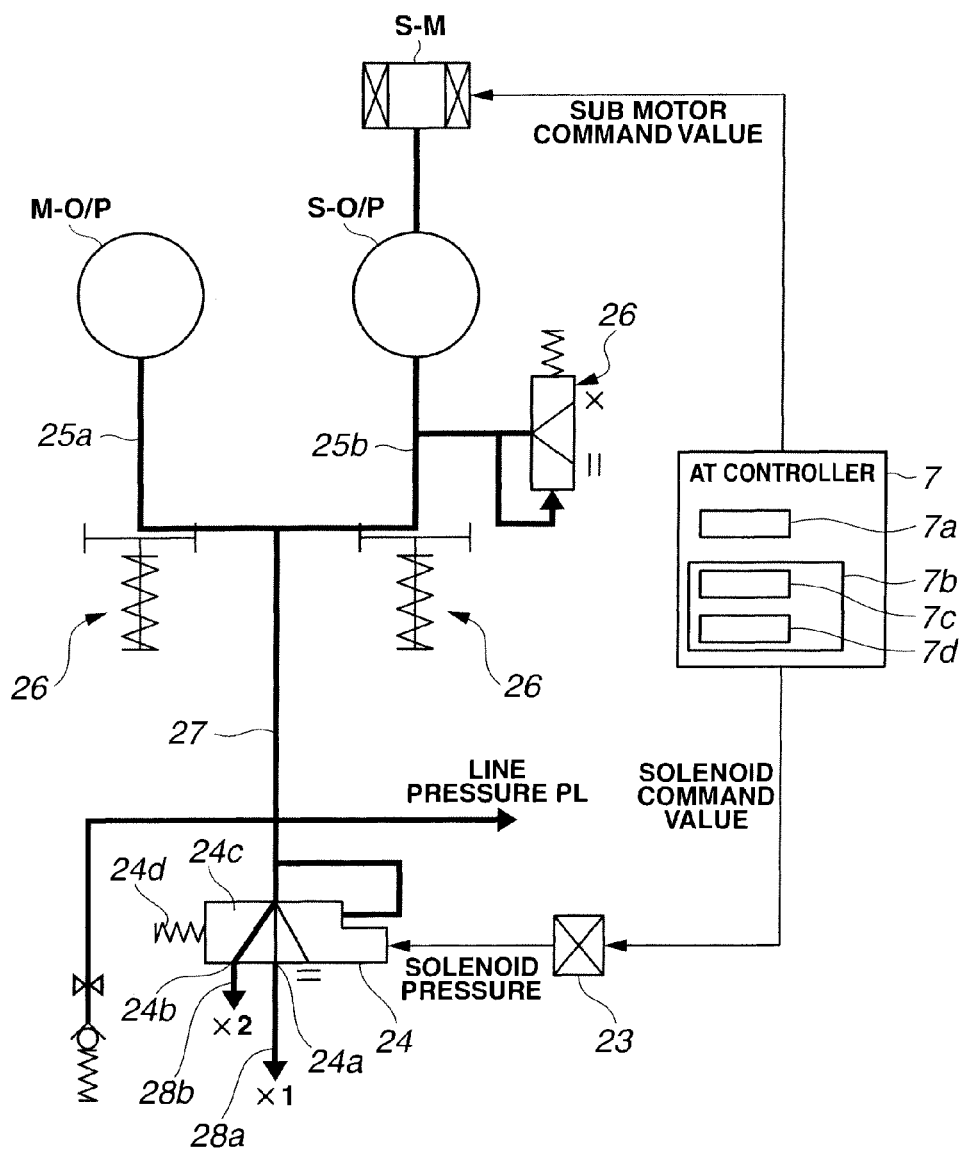
FIG. 4 is a diagrammatical view representing a line pressure control structure in the front-engine rear-wheel drive hybrid vehicle in the preferred embodiment shown in FIG. 1.

FIG. 4 shows a diagrammatical view representing a line pressure control structure in the FR hybrid vehicle in this embodiment shown in FIG. 1.

The line pressure control in the FR hybrid vehicle of the embodiment is, as shown in FIG. 4, carried out through mecha oil pump M-O/P, sub oil pump S-O/P (sub motor S-M), AT controller 7, line pressure solenoid 23, and a pressure regulator valve 24 (line pressure control valve).

It should be noted that mecha M-O/P and sub oil pump S-O/P which are hydraulic pressure sources are juxtaposed to each other and flapper valves 26, 26 are respectively disposed in a drain passage 25a of mecha oil pump M-O/P and a drain passage 25b of sub oil pump S-O/P. Each flapper valve 26, 26 has such a characteristic that the valve is open when the hydraulic pressure at the upstream side is equal to or higher than a predetermined pressure value and serves as a check valve to prevent the working oil from a downstream side to an upstream side (in this case, each of drain passages 25a, 25b from line pressure hydraulic pressure circuit 27). Furthermore, a relief valve 26' is disposed in one drain passage 25b of sub oil pump S-O/P so that the hydraulic pressure within one drain passage 25b is controlled to be not in excess of a predetermined pressure.

The oil passages located at a downstream side of respective flapper valves 26, 26 are united into one oil passage (hereinafter, referred to as a line pressure circuit 27). Pressure regulator valve 24 is installed in line pressure hydraulic pressure circuit 27.

AT controller 7 includes: a sub motor command value calculating block 7a which calculates a sub motor command value on a basis of a required line pressure set in accordance with an operating state of the hydraulic pressure system in the hybrid drive train; and a solenoid command value calculating block 7b which calculates a solenoid command value (control valve command value) on a basis of the required line pressure.

The sub-motor command value is inputted to sub motor S-M for actuating sub oil pump S-O/P. Sub motor S-M actuates sub oil pump S-O/P to output the pump pressure in accordance with the sub motor command value. The solenoid command value is inputted to a line pressure solenoid 23.

It should be noted that the solenoid command value is set by selecting a P. Reg (an abbreviation for the pressure regulator valve) regulated pressure (first control valve command value) and a sub O/P regulated pressure (second control valve command value). That is to say, solenoid command value calculating block 7b is provided with a P. Reg regulated pressure calculating block (first line pressure control section (means)) 7c which calculates a P. Reg regulated pressure and a sub O/P regulated pressure calculating block (second line pressure control section (means)) 7d which calculates a Sub O/P regulated pressure. The above-described P. Reg regulated pressure is a value of the required line pressure to which a first additive correction quantity which is decreased at a predetermined rate along with the increase in motor shaft revolution speed Nin is added.

The above-described Sub O/P regulated pressure is a value of the required line pressure to which a second additive correction quantity which is larger than the first additive correction quantity when motor shaft revolution speed Nin is lower than a predetermined motor shaft revolution speed N2 and is decreased at a rate larger than the decrease rate of the first additive correction quantity along with the increase of motor shaft revolution speed Nin.

Line pressure solenoid 23 produces a solenoid pressure to pressure regulator valve 24 in accordance with the solenoid command value (control valve command value) from AT controller 7 (specifically, solenoid command value calculating block 7b).

Pressure regulator valve 24 provides line pressure PL, with the supplied hydraulic pressure (pump pressure) from the hydraulic pressure sources as a source pressure and with the solenoid pressure as an actuation signal pressure, by draining the supplied hydraulic pressure to control the hydraulic pressure within line pressure hydraulic pressure circuit 27 to a value in accordance with the solenoid pressure. Pressure regulator valve 24 includes: a first drain port 24a; a second drain port 24b; a spool 24c; and a spring 24d.

First and second drain ports 24a, 24b are enabled to be open and to be closed by means of spool 24c. Spool 24c ordinarily closes first and second drain ports 24a, 24b according to a biasing force of spring 24d. This spool 24c is moved against the biasing force of spring 24d in response to a signal pressure outputted from line pressure solenoid 23 to open first and second drain ports 24a, 24b in this sequence. When first and second drain ports 24a, 24b are opened, line pressure hydraulic pressure circuit 27 is communicated with lubricating circuits 28a, 28b so that the supplied hydraulic pressure from the hydraulic pressure sources is drained to lubricating circuits 28a, 28b. It should to be noted that first drain port 24a is opened at a timing earlier than second drain port 24b, namely, first drain port 24a is opened in response to a smaller signal pressure.

Figure 5:
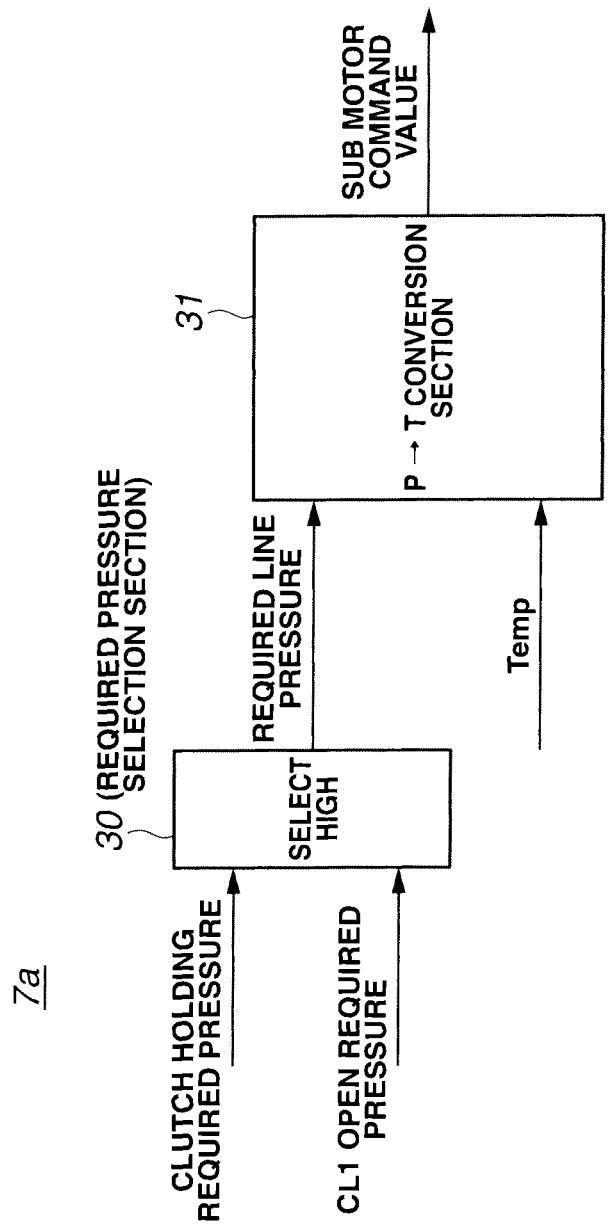
FIG. 5 is a calculating block diagram representing a sub motor command value calculating block in an AT controller in the preferred embodiment shown in FIG. 1.
Figure 6:
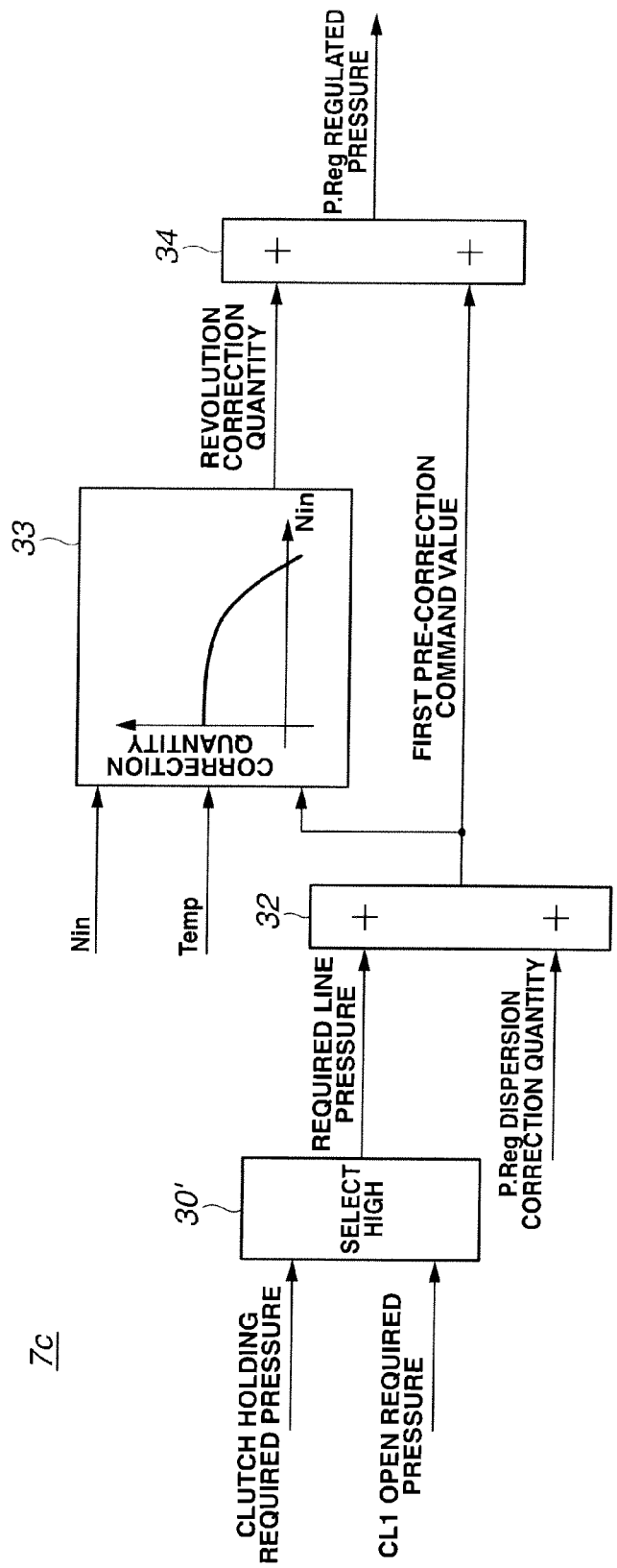
FIG. 6 is a calculating block diagram of P. Reg regulated pressure in the AT controller in the embodiment shown in FIG. 1.
Figure 7:
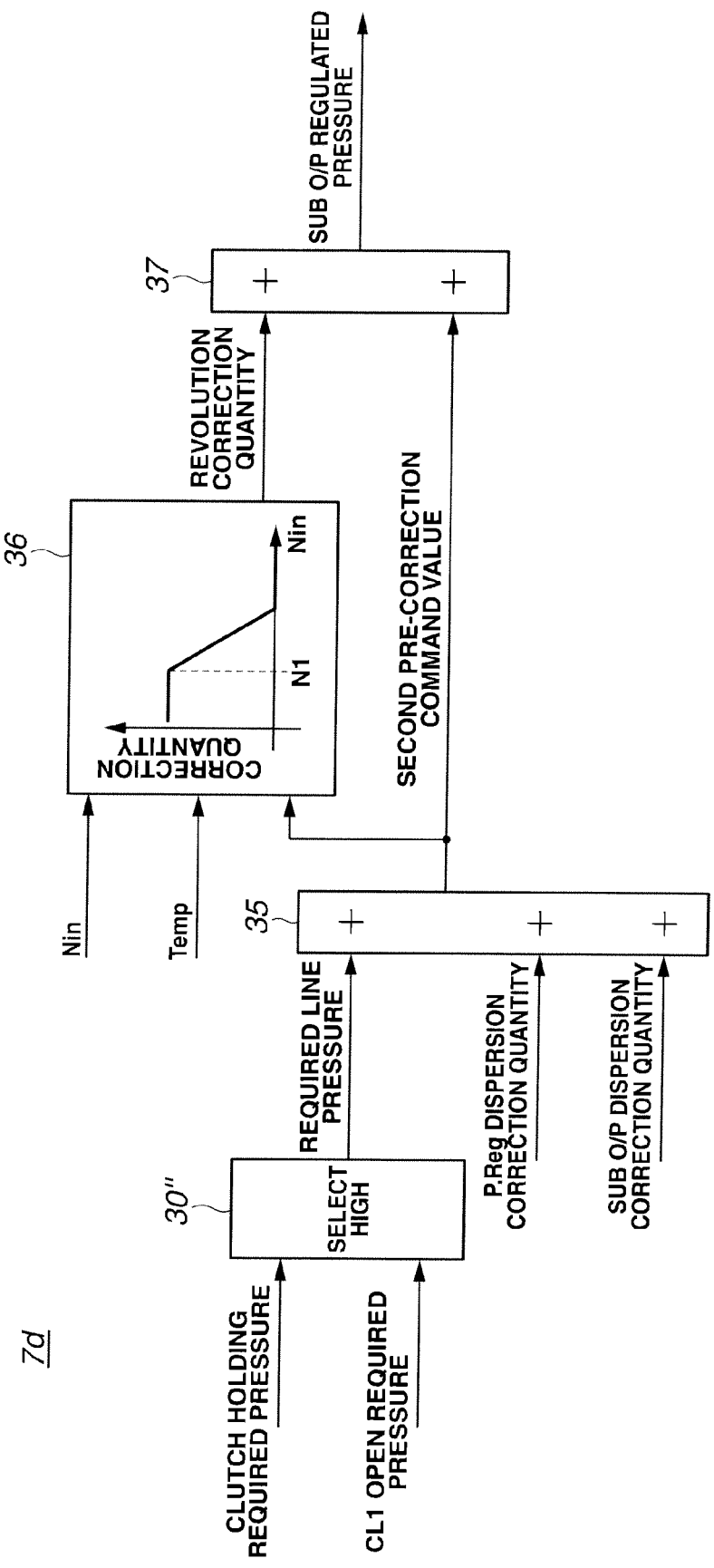
FIG. 7 is a calculating block diagram of Sub O/P regulated pressure in the AT controller in the embodiment shown in FIG. 1.

FIG. 5 diagrammatically shows sub motor command value calculating block 7a in AT controller 7 in is this embodiment.
FIG. 6 diagrammatically shows P. Reg regulated pressure calculating block 7c in AT controller 7 in this embodiment.
FIG. 7 diagrammatically shows Sub O/P regulated pressure calculating block 7d in AT controller 7 in this embodiment.

Sub motor command value calculating block 7a, as shown in FIG. 5, includes: a required pressure selection section 30; and a P (pressure)→T (torque) conversion section 31.

Required pressure selection section 30 inputs a clutch holding required pressure and a CL1 open required pressure, selects a maximum required pressure through a select high technique (hereinafter, called select high) from these required pressures and outputs one of the required pressures which gives the maximum required pressure to P→T (P to T) conversion section 31 as a required line pressure.

It should be noted that the clutch holding required pressure is a pressure value derived on a basis of a transmission input torque of automatic transmission AT, a transmission input revolution speed thereof, and the gear shift stage thereof and a lowest line pressure required to hold the clutch elements in engaged states at each gear shift stage which are held in the engagement state without slip. The CL1 open required pressure is a lowest line pressure required to open (release) first clutch CL1 corresponding to a CL1 open pressure command value for first clutch CL1.

P→T conversion section 31 inputs the required line pressure from required pressure selection section 30 and working oil temperature Temp (from working oil temperature sensor 18). Then, P→T conversion section 31 converts the required line pressure to the torque using a map provided therein to calculate and output the sub motor command value. At this time, the conversion map used is different according to working oil temperature Temp.

P. Reg regulated pressure calculating block 7c is, as shown in FIG. 6, provided with required pressure selection section 30', a valve correction quantity calculating section 32, a first revolution correction quantity calculating section 33, and a first revolution correction quantity addition section 34.

Required pressure selection section 30' inputs the above-described clutch holding required pressure and CL1 open required pressure, selects the maximum required pressure from these required pressures, and outputs the command value obtaining the maximum required pressure as the required line pressure to valve correction quantity addition section 32.

Valve correction quantity addition section 32 adds a P. Reg dispersion correction quantity to the required line pressure inputted from required pressure selection section 30' to calculate a first pre-correction command value. This first pre-correction command value is inputted to first revolution correction quantity calculating section 33 and first revolution correction quantity addition section 34, respectively.

It should be noted that P. Reg dispersion correction quantity is a preset correction quantity on a basis of a mechanical dispersion of pressure regulator valve 24 (a dimensional error in spool 24c, an error in spring 24d, a dimensional error in its valve body, and so forth).

First revolution correction quantity calculating section 33 inputs the revolution speed of transmission input shaft IN (motor shaft revolution speed Nin from motor controller 2) and working oil temperature Temp (from working oil temperature sensor 18) and inputs the first pre-correction command value from valve correction quantity to addition section 32. Then, first revolution correction quantity calculating section 33 sets and outputs the revolution correction quantity determined in accordance with motor shaft revolution speed Nin using a map provided therein.

Figure 8A:
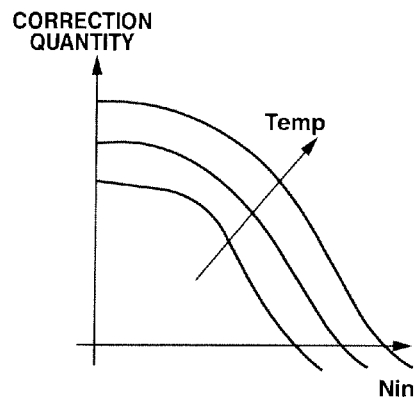
FIGS. 8A and 8B are map views of revolution correction quantity calculations in a P. Reg regulated pressure calculating block, FIG. 8A representing that the map is different for different (each) working oil temperature and FIG. 8B representing that the map is different for different (each) required line pressure.
Figure 8B:
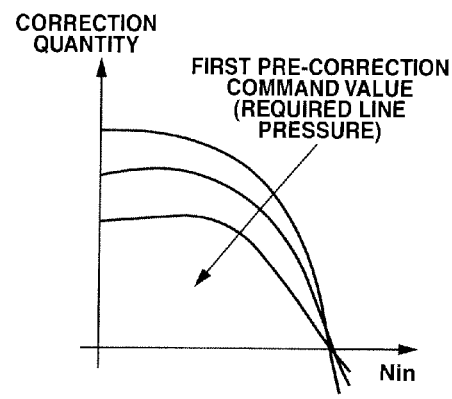

The revolution correction quantity outputted from first correction quantity calculating section 33 is a difference between a set line pressure characteristic set when a discharge quantity of mecha oil pump M-O/P is a flow quantity during an ordinary run of the vehicle (a state in which the pump pressure can sufficiently be secured) and the line pressure characteristic at a discharge quantity (flow quantity) of actual mecha oil pump M-O/P. That is to say, the line pressure characteristic is different dependently upon the discharge quantity (flow quantity) of mecha oil pump M-O/P. Hence, the revolution correction quantity is the correction quantity set with this flow quantity dependency taken into consideration and an additive correction quantity required to secure the required line pressure by freely closing first and second drain ports 24a, 24b of pressure regulator valve 24 in a case where the actual discharge quantity of mecha oil pump M-O/P is small. This revolution correction quantity is set on a basis of experimental data and has a characteristic such as to be decreased at a predetermined rate along with the increase in motor shaft revolution speed Nin. The correction quantity setting map used at this time is different according to working oil temperature Temp and first pre-correction command value (required line pressure) as shown in FIGS. 8A and 8B. It should be noted that a longitudinal axis of each of FIGS. 8A and 8B denotes the correction quantity which corresponds to the revolution correction quantity shown in FIG. 6 and the first additive correction quantity.

First revolution correction quantity addition section 34 adds the revolution correction quantity determined at first revolution correction quantity calculating section 33 to first pre-correction command value inputted from valve correction quantity addition section 32 to calculate P. Reg regulated pressure. This P. Reg regulated pressure is selected according to the predetermined condition and is inputted to line pressure solenoid 23 as the solenoid command value.

Sub O/P regulated pressure calculating block 7d is provided with required pressure selection section 30", a valve-and-pump correction quantity addition section 35, a second revolution correction quantity calculating section 36, and a second revolution correction quantity addition section 37.

Required pressure selection section 30" inputs the above-described clutch holding required pressure and CL1 open required pressure, selects the maximum required pressure from these required pressures through the select high, and outputs the command value obtaining the maximum required pressure as the required line pressure to valve-and-pump correction quantity addition section 35.

It should be noted that valve-and-pump correction quantity addition section 35 adds P. Reg dispersion correction quantity and Sub O/P dispersion correction quantity to the required line pressure inputted from required pressure selection section 30" to calculate the second pre-correction command value. This second pre-correction command value is inputted to second revolution correction quantity calculating section 36 and second revolution correction quantity addition section 37, respectively.

It should also be noted that the P. Reg dispersion correction quantity is a preset correction quantity on a basis of the mechanical dispersion of pressure regulator valve 24 (the dimensional error in spool 24c, the error in spring 24d, the dimensional error in its valve body, and so forth).

In addition, the Sub O/P dispersion correction quantity is the preset correction quantity on a basis of the torque dispersion of sub oil pump S-O/P.

Second revolution correction quantity calculating section 36 inputs the revolution speed of transmission input shaft IN (motor shaft revolution speed Nin from motor controller 2) and working oil temperature Temp (from working oil temperature sensor 18) and inputs the second pre-correction command value from valve-and-pump correction quantity addition section 35. Second revolution correction quantity calculating section 36 sets and outputs the revolution correction quantity determined according to motor shaft revolution speed Nin using a map provided therein.

The revolution correction quantity outputted from this second revolution correction quantity calculating section 36 is the additive correction quantity required not to open first drain port 24a of pressure regulator valve 24 and is set on a basis of the experimental data.

It should be noted that, in order to reduce an influence of the revolution speed of motor shaft Nin on a sound vibration together with the increase in motor shaft revolution speed Nin, first drain port 24a may be open to drain the pump pressure. Therefore, this revolution correction quantity is set to a constant value until motor shaft revolution speed Nin reaches to a predetermined revolution speed N1 and, thereafter, is decreased gradually at a constant rate along with the increase in motor shaft revolution speed Nin orienting a stop of sub oil pump S-O/P. Thus, line pressure PL is dependent upon the rise in the discharge quantity of mecha oil pump M-O/P.

It should be noted that the decrease rate of this revolution correction quantity is a value larger than the decease rate of the revolution correction quantity outputted by first correction quantity calculating section 33.

Figure 9A:
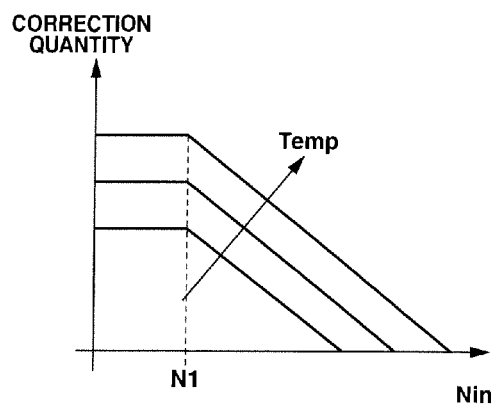
FIGS. 9A and 9B are map views of the revolution correction quantity calculations in a sub O/P regulated pressure calculating block, FIG. 9A representing that the map is different for different (each) working oil temperature and FIG. 9B representing that the map is different for different (each) required line pressure.
Figure 9B:
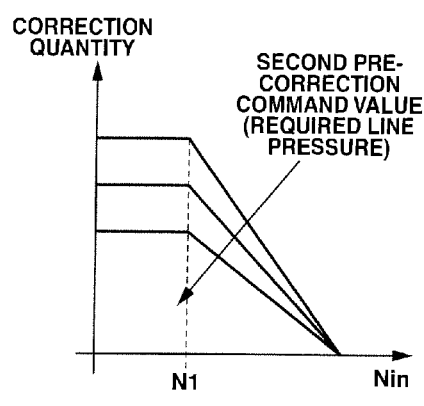

The correction quantity setting map used therein is different according to working oil temperature Temp and second pre-correction command value (required line pressure), as shown in FIGS. 9A and 9B. It should be noted that the longitudinal axis in each of FIGS. 9A and 9B denotes the revolution correction quantity shown in FIG. 7 which corresponds to the second additive correction quantity.

Second revolution correction quantity addition section 37 adds the revolution correction quantity derived at second revolution correction quantity calculating section 36 to the second pre-correction command value inputted from valve-and-pump correction quantity addition section 35 to calculate the Sub O/P regulated pressure.

This Sub O/P regulated pressure is selected according to a predetermined condition and inputted to line pressure solenoid 23 as the solenoid command value.

Next, a line pressure control process executed by AT controller 7 in the embodiment will be described using a flowchart shown in FIG. 10.

That is to say, at a step S1, AT controller 7 calculates P. Reg regulated pressure at P. Reg regulated pressure calculating block 7c and Sub O/P regulated pressure at Sub O/P regulated pressure calculating block 7d in accordance with the required line pressure determined through the select high from the clutch holding required pressure and the CL1 open required pressure. Then, the routine goes to a step S2.

At a step S2, At controller 7 determines whether the required line pressure used at step S1 is equal to or higher than the discharge pressure from mecha oil pump M-O/P, subsequent to the calculation of P. Reg regulated pressure and Sub O/P regulated pressure at step S1. If Yes (required line pressure≥mecha O/P pressure) at step S2, the routine goes to a step S4 since the discharge quantity from mecha oil pump M-O/P is insufficient. If No (required line pressure<mecha O/P pressure), the routine goes to a to step S3 since the required line pressure can be secured by the discharge pressure from mecha oil pump M-O/P.

At step S3, AT controller 7 executes an ordinary control for sub motor S-M and line pressure solenoid 23, subsequent to the determination that required line pressure<mecha O/P pressure at step S2. Then, the routine is returned.

It should, herein, be noted that the ordinary control is defined as in the following control:

A motor stop signal is outputted for sub motor S-M.

The P. Reg regulated pressure is selected as the solenoid command value and outputted to line pressure solenoid 23. Consequently, sub oil pump S-O/P is stopped and line pressure PL is controlled on a basis of P. Reg regulated pressure.

At step S4, At controller 7 actuates sub oil pump S-O/P, subsequent to the determination that required line pressure is equal to or larger than mecha O/P pressure. Then, the routine goes to a step S5. At this time, the sub motor command value calculated at sub motor command value calculating block 7a is inputted to the sub motor S-M.

At step S5, AT controller 7 sets the solenoid command value according to the select high between P. Reg regulated pressure and Sub O/P regulated pressure and outputs the solenoid command value to line pressure solenoid 23 and the routine is returned.

Figure 11:
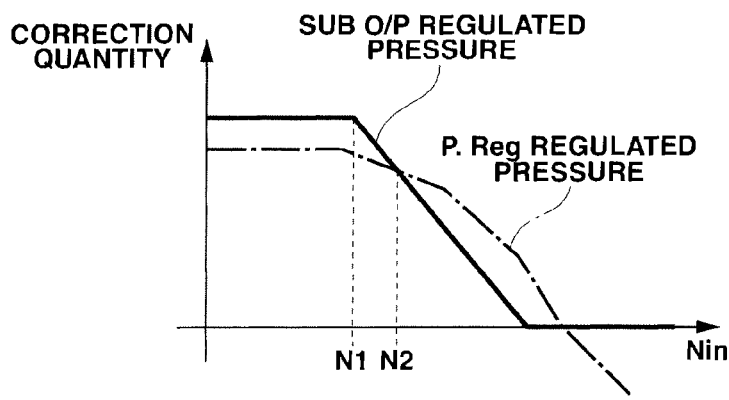
FIG. 11 is an explanatory view representing a relationship between the correction quantity of P. Reg regulated pressure and a motor shaft revolution speed of Sub O/P regulated pressure.

That is to say, FIG. 11 shows magnitudes of the additive correction quantities in P. Reg regulated pressure and Sub O/P regulated pressure. When Sub O/P regulated pressure is calculated, the Sub O/P dispersion correction quantity is added in valve-and-pump correction quantity addition section 35. Therefore, in Sub O/P regulated pressure, the additive correction quantity to the required line pressure basically becomes larger than P. Reg regulated pressure which is the addition of a predetermined (additive) correction quantity (P. Reg dispersion correction quantity plus the revolution correction quantity) to the required line pressure. Consequently, Sub O/P regulated pressure>P. Reg regulated pressure.

However, the revolution correction quantity is, in the P. Reg regulated pressure, a value to correct the difference from the line pressure characteristic set at a time of the flow quantity during the ordinary traveling and is decreased at the predetermined rate along with the increase in motor shaft revolution speed Nin, in the case of P. Reg regulated pressure. On the other hand, in the case of Sub O/P regulated pressure, the revolution correction quantity is decreased at a rate larger than the decrease rate in the case of P. Reg regulated pressure when motor shaft revolution speed Nin has reached to a predetermined revolution speed N1. Therefore, when motor shaft revolution speed Nin is equal to or higher than another predetermined revolution speed N2, the additive correction quantity is reversed to indicate Sub O/P regulated pressure<P. Reg regulated pressure.

Next, an action will be described below. First, a task in the line pressure control in a comparative example to the present invention and a flow quantity dependency of the pressure regulator valve will be described. Subsequently, the action in the control apparatus in the hybrid vehicle in the embodiment will be described, the explanation thereof dividing a line pressure control action corresponding to a low revolution region and the line pressure control action according to the select high.

[Task in the Line Pressure Control in a Comparative Example]

FIG. 12 shows a timing chart representing each characteristic of motor shaft revolution speed Nin, the sub motor revolution speed, the solenoid command value, the sub motor command value, the required line pressure, and the actual line pressure in the line pressure control at a time of the actuation of electrically driven oil pump in the comparative example (comparative example with the present invention according to the present invention).

In the hybrid vehicle, it is necessary to separate first clutch CL1 in order to produce a state in which engine Eng is stopped. In this state, the vehicle is traveling in the EV mode, stopped, or regenerated. That is to say, in order to achieve this EV mode, it is necessary to open first clutch CL1 with the line pressure secured even in a region in which the motor revolution speed is low.

It should be noted that mecha oil pump M-O/P is directly coupled with the motor shaft and is actuated by means of engine Eng or motor/generator MG. Therefore, at a time of the vehicle stop in the EV mode, motor/generator MG is stopped so that the required line pressure cannot be secured. In addition, in a state in which the revolution speed is low at the time of EV mode, the discharge quantity of mecha oil pump M-O/P is reduced so that the required line pressure cannot often be secured. Therefore, sub oil pump S-O/P, which is actuated through sub motor S-M, is disposed to secure the hydraulic pressure source in the low revolution speed region of motor shaft revolution speed Nin.

In addition, a torque control method which controls the discharge hydraulic pressure from sub oil pump S-O/P by inputting the sub motor command value, which specifies the discharge pressure, to sub motor S-M has been adopted in this sub oil pump S-O/P. Thus, the adoption of this torque control method causes an elimination in a wasteful discharge and can contribute on the improvement in fuel consumption.

However, even during the actuation of sub oil pump S-O/P, pressure regulator valve is, finally, used to carry out the line pressure control in terms of the structure of the hydraulic pressure circuit. That is to say, during the actuation of sub oil pump S-O/P, the sub motor command value is outputted to sub motor S-M and the solenoid command value is outputted to the line pressure solenoid which controls the pressure regulator valve.

In addition, the actual line pressure often becomes low for the solenoid command value due to the dispersion of the pressure regulator valve. In details, the solenoid command value is set to open the drain ports of the pressure regulator valve when the line pressure has reached to a predetermined value. However, the drain ports are often open before the line pressure reaches to the predetermined value. If such a phenomenon as described above occurs at a time of actuation of sub oil pump S-O/P, the drain ports are open before the actual line pressure reaches to the required line pressure so that the required line pressure cannot be obtained.

Especially, the line pressure characteristic with respect to the flow quantity has the flow quantity dependency as will be described later and indicates the characteristic such that, as the flow quantity becomes lower, namely, as motor shaft revolution speed Nin becomes lower, the actual line pressure becomes lower.

Furthermore, when the source pressure (the supplied hydraulic pressure from sub oil pump S-O/P) from the pressure regulator valve is drained, the load of sub oil pump S-O/P is reduced. The revolution speed of sub motor S-M which actuates sub oil pump S-O/P is, hence, raised. In addition, even if the sub motor revolution speed indicates the maximum revolution speed, the drainage from the line pressure regulator valve is continued. Hence, the torque in sub oil pump S-O/P becomes under an unbalanced state. Thus, the sub motor revolution speed is maintained at a high revolution state. Therefore, such a problem as the generation of high-frequency noises from sub motor S-M and a shortening in a life span of sub motor S-M due to the continuation of the high-speed driving occurs.

In order to solve this problem, it is thought that the command value to sub motor S-M is set to a value higher than the required line pressure during the actuation of sub oil pump S-O/P, with the dispersion and the flow quantity dependency of the pressure regulator valve taken into consideration. In other words, as shown in FIG. 12, if an ignition (switch) is turned to ON at a time point t0, the sub motor command value is set to be higher than the required line pressure. Thus, the sub motor is revolved at a predetermined revolution speed N. On the other hand, the solenoid command value provides a value which is an addition value of another predetermined (additive) correction quantity (the correction quantity based on the dispersion of the pressure regulator valve and the correction quantity based on the flow quantity dependency) to the required line pressure, namely, P. Reg regulated pressure. It should be noted that the other predetermined (additive) correction quantity is slightly different from the predetermined (additive) correction quantity described above.

However, even if the sub motor command value is set to be high, the additive correction quantity in the solenoid command value is small. Thus, the drain ports of the pressure regulator valve tend to be open. Consequently, the rise in the actual line pressure becomes delayed and the control accuracy of the line pressure is reduced. Then, the load of sub oil pump S-O/P is low and the sub motor revolution speed becomes increased. Then, at a time point t1, the sub motor revolution speed provides a maximum value MAX. Thereafter, sub motor S-M is continued to maintain the maximum revolution speed. On the other hand, since the sub motor command value is higher than the required line pressure, the actual line pressure gradually indicates a value higher than the required line pressure. However, since the discharge pressure is wastefully drained from sub oil pump S-O/P, this leads to the worsening of the fuel consumption.

As described above, the sub motor command value is set to be higher than the required line pressure so that the revolution speed of sub motor S-M is high. In addition, even if the sub motor command value is set to be high, the dispersion of the pressure regulator valve cannot sufficiently be absorbed. Thus, the drain port tends to be open and the sub motor revolution speed is at last continued to maintain maximum revolution speed value MAX. Thus, such problems as the generation of high-frequency noises, the shortening of the life span of the sub motor, the reduction in the line pressure control accuracy, and the worsening of the fuel consumption cannot be solved.

It is thought that the above-described problems can be solved by modifying the characteristic of the pressure regulator valve to a characteristic such as to be controllable from the low revolution speed region of the motor shaft revolution speed. However, ordinarily, the pressure regulator valve has an aim that the working oil is accurately supplied to the downstream side. Therefore, in a case where the source pressure is equal to or below a predetermined value, the pressure regulator valve has the characteristic such that the pressure regulator valve does not perform the pressure regulation but performs the pressure regulation when the source pressure is equal to or higher than the predetermined value. Furthermore, he pressure regulation characteristic of this pressure regulator valve is set with the discharge pressure from mecha oil pump M-O/P after the engine start as a reference and no consideration of a case where the motor shaft revolution speed is low is given. Therefore, to modify the control characteristic of the pressure regulator valve, the dimension modification of the pressure regulator valve and accompanying layout modification are needed. In addition, it is thought that a possibility that a sufficient line pressure cannot be secured during a mechanical failure of the pressure regulator valve occurs. With such matters as described above taken into consideration, it is not actual practice to modify the control characteristic of the pressure regulator valve.

[Flow Quantity Dependency (Characteristic) of the Pressure Regulator Valve]

Figure 13A:
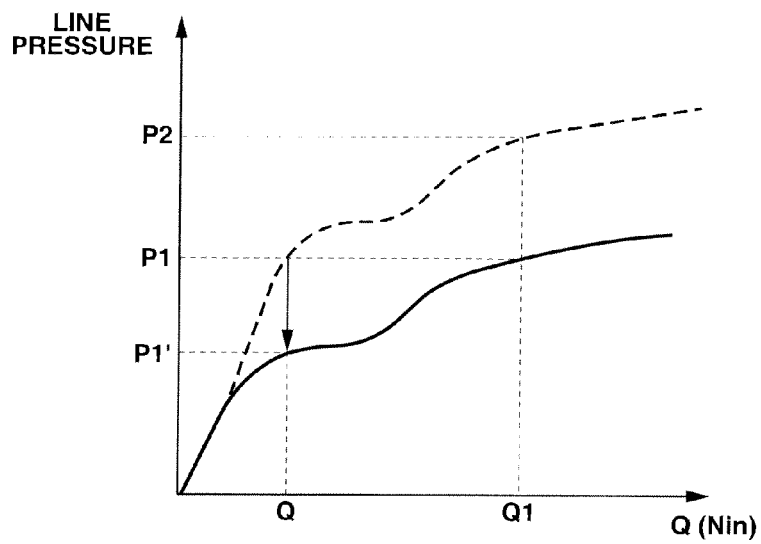
FIG. 13A is an explanatory view on a flow quantity dependency of the line pressure control valve.
Figure 13B:
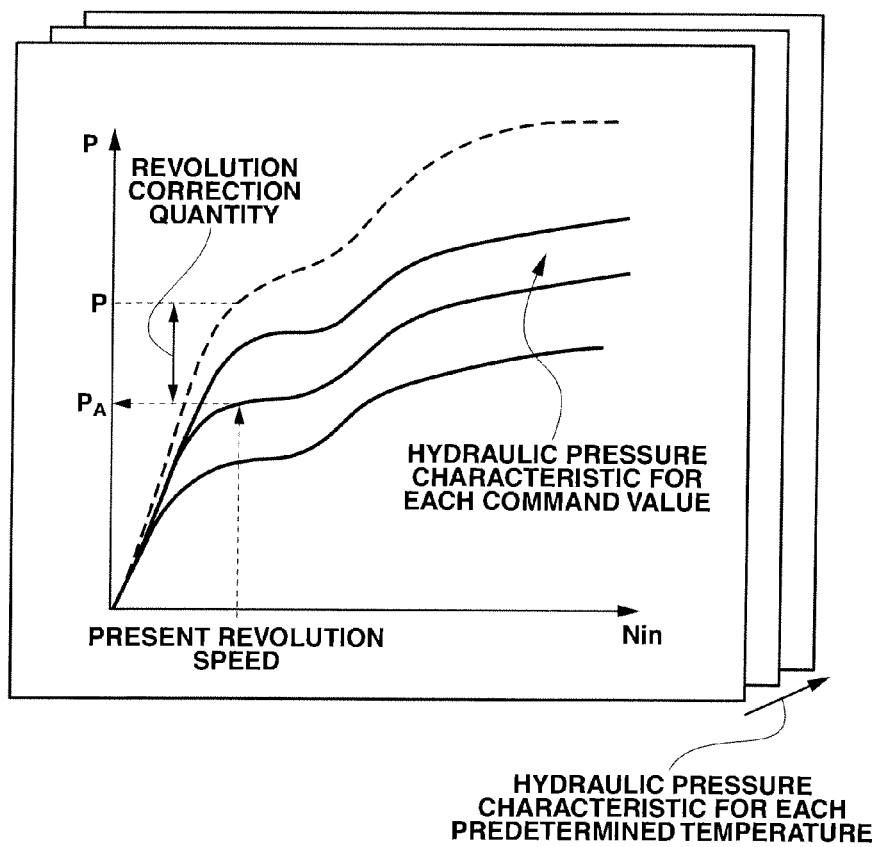
FIG. 13B is an explanatory view on a method of deriving a correction quantity with respect to the flow quantity dependency of the line pressure regulator valve.

FIG. 13A shows an explanatory view of a flow quantity dependency characteristic of the line pressure control valve and FIG. 13B shows an explanatory view of a method deriving the correction quantity for the flow quantity dependency (characteristic) of the line pressure control valve.

Since the pressure regulation characteristic of the pressure regulator valve is set supposing a case when the pump pressure of the mecha oil pump is very high (a case where a discharge flow quantity of the mecha oil pump is large), the pressure regulation is performed at a time point at which the first and second drain ports are open. In other words, the flow quantity delivered toward the downstream side of the pressure regulator valve is drained. This is a prerequisite. The pressure regulation characteristic at this time is denoted by a broken line in FIG. 13A.

However, it is known that, when the pump pressure of mecha oil pump is low (a case where the mecha oil pump discharge quantity is small), the line pressure becomes small (a characteristic denoted by a solid line in FIG. 13A) even if the same command value (flow quantity Q) is issued with respect to the set pressure regulation characteristic denoted by the broken line in FIG. 13A, when the pump pressure of mecha oil pump is low (a case where the discharge flow quantity of the mecha oil pump is small). In other words, the pressure regulation characteristic of the pressure regulator valve is different depending upon flow quantity Q from the mecha oil pump. That is to say, when the pressure regulator valve is controlled on a basis of the set regulated pressure characteristic, such a phenomenon occurs that the drain ports are open before the actual line pressure reaches to the required pressure.

However, since the pump pressure of mecha oil pump is not zero, a drain flow quantity of the pressure regulator valve is limited so that the line pressure can be raised. In other words, if the command value of the pressure regulator valve is increased, the drain ports thereof become difficult to be opened so that, even if the discharge flow quantity of mecha oil pump is equal to or below a supposed flow quantity at a time of setting the pressure regulation characteristic, the line pressure can be raised.

Specifically, for example, suppose that the required line pressure is P1 (refer to FIG. 13A). At this time, since the actual pressure regulation characteristic is denoted by the solid line in FIG. 13A, the line pressure is raised only to P1' shown in FIG. 13A if the command valve to the pressure regulator valve is set to P1. In other words, the drain ports of the pressure regulator valve are open before the actual line pressure reaches to the required line pressure (in this case, P1) so that the drain flow quantity is developed. Therefore, if the correction quantity is added to the command value to the pressure regulator valve to raise the command value to P2, the actual line pressure at the flow quantity of Q1 can be changed to P1. This additive correction quantity is the revolution correction quantity which is the correction quantity with respect to the flow quantity (revolution) dependency (characteristic).

Then, as the method of calculating the revolution correction quantity, the hydraulic pressure characteristic determined according to motor shaft revolution speed Nin is derived for each of the command values and for each of the working oil temperatures derived through the experiments and, with motor shaft revolution speed, the command value, and the working oil temperature as input to conditions, the present actual line pressure is calculated. Consequently, a hydraulic pressure difference between line pressure P in the set pressure regulation characteristic (denoted by the broken line in FIG. 13B) and present actual line pressure (in this case, $P_A$) is derived and this difference is set as the revolution correction quantity.

[Line Pressure Control Action Corresponding to the Low Revolution Region]

FIG. 14 shows a timing chart representing each characteristic of motor shaft revolution speed, sub motor revolution speed, the solenoid command value, a sub pump relief pressure, the sub motor command value, the required line pressure, and the actual line pressure during the actuation of the electrically driven oil pump, in the control apparatus for the hybrid vehicle in this embodiment.

In the control apparatus for the hybrid vehicle in the embodiment, as shown in FIG. 14, when the ignition (switch) is turned to ON at a time point t2, P. Reg regulated pressure and Sub O/P regulated pressure are calculated and a determination of whether the required line pressure can be maintained according to the discharge pressure from mecha oil pump M-O/P is made. At this time, motor shaft revolution speed Nin is so low that the determination that the required line pressure cannot be maintained only by the discharge pressure from mecha oil pump M-O/P is made. Thus, sub oil pump S-O/P is actuated.

Figure 10:
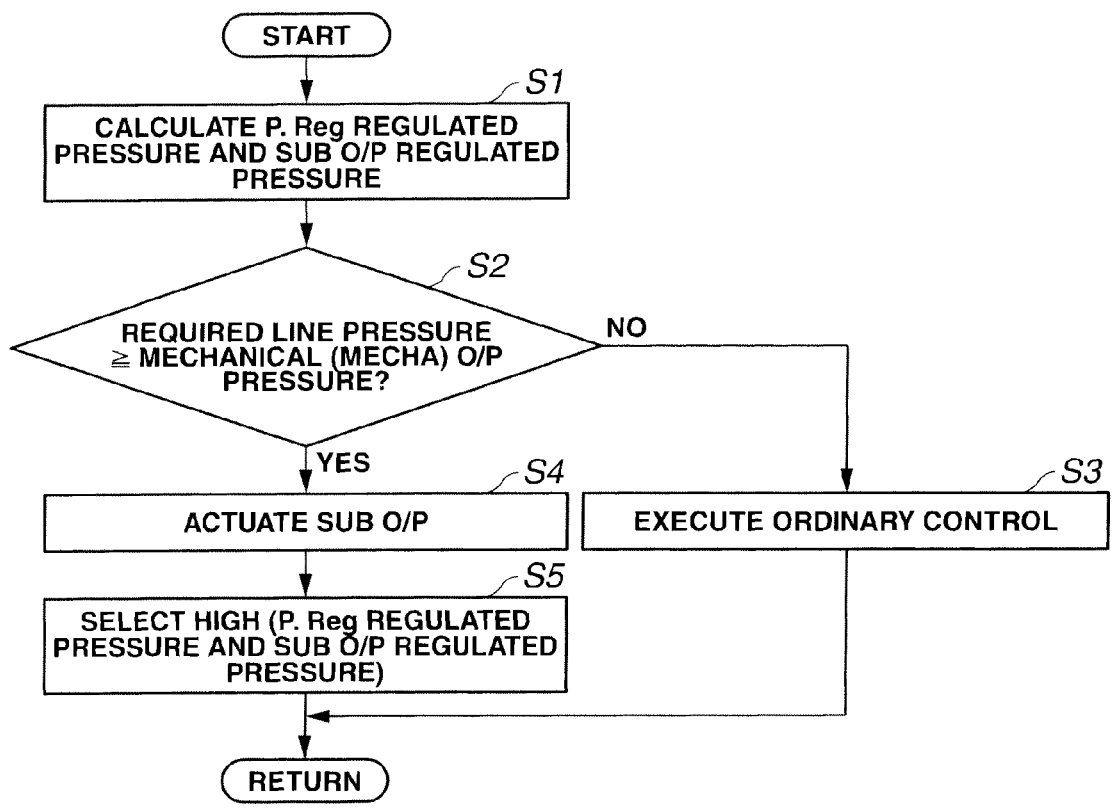
FIG. 10 is a flowchart representing a flow of a line pressure control process executed in the AT controller in the embodiment shown in FIG. 1.

In other words, the routine shown in the flowchart of FIG. 10 is advanced as follows: step S1→step S2→step S4. At this time, sub motor S-M receives the sub motor command value calculated in sub motor command value calculating block 7a. This sub motor command value is a value which accords with the required line pressure although the influence of working oil temperature is taken into consideration (in FIG. 14, the sub motor command value provides the value coincident with the required line pressure).

Then, in the flowchart of FIG. 10, the routine goes to step S5. At step SS5, the solenoid command value is set according to the select high between P. Reg regulated pressure and Sub O/P regulated pressure (one of P. Reg regulated pressure and Sub O/P regulated pressure which is larger than the other).

It should be noted that, as far as the additive correction quantity (first additive correction quantity as will be described later) in the P. Reg regulated pressure and the additive correction quantity (second additive correction quantity as will be described later) in the Sub O/P regulated pressure are concerned, the additive correction quantity in the Sub O/P regulated pressure is, as shown in FIG. 11, larger than that in P. Reg regulated pressure until motor shaft revolution speed Nin reaches to predetermined revolution speed N1. That is to say, the solenoid command value is set to Sub O/P regulated pressure until motor shaft revolution speed Nin reaches to predetermined revolution speed N1.

As described above, in the low revolution region of the motor shaft revolution speed, the solenoid command value is set by the sub O/P regulated pressure whose additive correction quantity is large. Thus, the solenoid command value becomes large so that first and second drain ports 24a, 24b of pressure regulator valve 24 are controlled toward a closure side. That is to say, the solenoid command value in the low revolution region of the motor shaft revolution speed is set to a value such that first drain port 24a which is open at the earlier timing than second drain port 24b is not open.

Thus, the drain flow quantity of pressure regulator valve 24 is eliminated and the actual line pressure is raised so that the required line pressure can be secured by the discharge pressure from sub oil pump S-O/P. This prevents the reduction of load of sub motor S-M actuating sub oil pump S-O/P. Thus, the rise in revolution speed of sub motor S-M does not occur. Consequently, the problems of the generation of the high-frequency noises along with the rise in sub motor revolution speed, the shortening of the life span of sub motor S-M, the reduction in the line pressure control accuracy, and the worsening of the fuel consumption can be prevented from occurring.

In addition, the solenoid command value at this time is set according to the select high between P. Reg regulated pressure and sub O/P regulated pressure. Thus, while the revolution speed rise of sub motor S-M is suppressed, the error developed in the pressure regulator due to the flow quantity dependency (characteristic) can appropriately be corrected.

In addition, sub O/P regulated pressure is set to be gradually decreased when motor shaft revolution speed Nin reaches to predetermined revolution speed N1. This is because the influence on the sound vibration becomes small due to the rise in motor shaft revolution speed Nin so that the open of first and second drain ports 24a, 24b may be permitted. That is to say, when motor shaft revolution speed Nin reaches to a constant revolution speed, the discharge quantity from mecha oil pump M-O/P can be secured to some extent and the additive correction quantity can be decreased toward the stop of sub oil pump S-O/P. Consequently, line pressure PL can be reduced and the improvement in the fuel consumption can be achieved.

Furthermore, in the control apparatus for the hybrid vehicle in the embodiment, the revolution correction quantities in P. Reg regulated pressure and sub O/P regulated pressure are set in accordance with motor shaft revolution speed Nin, working oil temperature Temp, and the required line pressure. Therefore, the control valve command value is set in accordance with motor shaft revolution speed Nin, working oil temperature Temp, and the variation in the required line pressure. The line pressure control valve can be controlled in an appropriate state and can contribute on the improvement in the fuel consumption.

[Line Pressure Control Action According to the Select High]

At a time point t3 shown in FIG. 14, the vehicle has started and motor shaft revolution speed Nin is raised. At this time point, the discharge pressure from mecha oil pump M-O/P is gradually increased. The actual line pressure is raised along with the gradual increase in the discharge pressure described above. When the actual line pressure has reached to the relief pressure of relief valve 26' installed in discharge passage of sub oil pump S-O/P, the discharge pressure of sub oil pump S-O/P is drained from relief valve 26'. Thus, the actual line pressure maintains the relief pressure.

When motor shaft revolution speed Nin is, furthermore, raised and has reached to predetermined revolution speed N1 at a time point of t4, the discharge pressure from mecha oil pump M-O/P is increased and flapper valve 26 installed in discharge passage 25b of sub oil pump S-O/P is closed. After flapper valve 26 is closed, the discharge pressure cannot be drained from relief valve 26'. Hence, there is a possibility of the rise in the actual line pressure by the drain flow quantity (as denoted by a dot-dot-dot-and-dash line in FIG. 14).

In the control apparatus for the hybrid vehicle in this embodiment, the solenoid command value is gradually reduced at a time point of t4 with the additive correction quantity in the sub O/P regulated pressure gradually decreased in order to gradually decrease motor shaft revolution speed Nin from predetermined revolution speed N1. Thus, first and second drain ports 24a, 24b of pressure regulator valve 24 are controlled toward the open side to enable the suppression of the rise in the actual line pressure. It should be noted that, since an abrupt decrease of the solenoid command value may lead to the actual line pressure lower than the required line pressure, the solenoid command value is gradually decreased at a constant rate.

Then, when the discharge pressure from mecha oil pump M-O/P is in excess of the required line pressure at a time point t5, the routine of the flowchart in FIG. 10 is advanced as follows: step S1→step S2→step S3. Thus, sub oil pump S-O/P is stopped and sub motor revolution speed becomes zero. On the other hand, the solenoid command value is set to the P. Reg regulated pressure.

As described above, if the required line pressure can be secured according to the discharge pressure from mecha oil pump M-O/P, the transfer of control to the ordinary control permits the improvement in the fuel consumption without wasteful rise in line pressure PL.

Next, the effects that the control apparatus for the hybrid vehicle in the embodiment described above provides will be described below.

(1) The control apparatus for the hybrid vehicle comprises: engine Eng; motor (motor/generator) MG; hydraulic pressure clutch (first clutch) CL1 interposed between engine Eng and motor MG to perform the engagement thereof and the release (open) thereof; transmission (automatic transmission) AT interposed between motor MG and driving wheels (left and right rear road wheels) RL, RR to perform the change in at least one of the gear shift stage and the transmission gear ratio according to the hydraulic pressure; mechanical oil pump (mecha oil pump) M-O/P actuated by means of at least one of engine Eng and motor MG to perform the hydraulic pressure supply; electrically driven oil pump (sub oil pump) S-O/P actuated by means of sub motor S-M to perform the hydraulic pressure supply; line pressure control valve (pressure regulator valve) 24 disposed at the downstream side of each of mechanical oil pump M-O/P and electrically driven oil pump S-O/P to decrease the supplied hydraulic pressure from at least one of mechanical oil pump M-O/P and electrically driven oil pump S-O/P by opening drain ports thereof 24a, 24b in accordance with a control valve command value (solenoid command value); and line pressure control section (AT controller) 7 configured to set the control valve command value by adding a predetermined additive correction quantity to the required line pressure set in accordance with operating states of hydraulic pressure clutch CL1 and transmission AT and to control drain ports 24a, 24b of line pressure control valve 24 to a closure side, during an actuation of electrically driven oil pump S-O/P.

Hence, the rise in the revolution speed of the sub motor which actuates the electrically driven oil pump is suppressed so that the improvement in the line pressure control accuracy, the improvement in the fuel consumption, the reduction in noises, and the improvement in the durability can be achieved.

(2) Line pressure control section (AT controller) 7 comprises: first line pressure control section (P. Reg regulated pressure calculating block) 7c configured to set a first control valve command value (P. Reg regulated pressure) by adding a first additive correction quantity which decreases at the predetermined rate along with the increase in the motor shaft revolution speed to the required line pressure; and second line pressure control section (Sub O/P regulated pressure calculating block) 7d configured to set a second control valve command value (Sub O/P regulated pressure) by adding a second additive correction quantity, which is larger than the first additive correction quantity when the motor shaft revolution speed is lower than a predetermined revolution speed (N2) and decreases at a rate larger than the predetermined rate of decrease in the first additive correction quantity along with the increase in the motor revolution speed when the motor revolution speed has reached to another predetermined motor revolution speed (N1), to the required line pressure, to and, when the discharge pressure from mechanical oil pump (M-O/P) is equal to or lower than the required line pressure, the line pressure control section actuates the electrically driven oil pump (S-O/P) and sets the control valve command value (solenoid command value) according to the select high between the first control valve command value (P. Reg regulated pressure) and the second control valve command value (Sub O/P regulated pressure). Therefore, the control valve command value can be set to an appropriate value. While the rise in the revolution speed of the sub motor (S-M) is suppressed, the error developed in the line pressure control valve (24) can appropriately be corrected.

(3) The line pressure control section (AT controller) 7 sets each of the predetermined additive correction quantity, first additive correction quantity, and the second additive correction quantity, in accordance with the revolution speed of motor MG. Thus, the control valve command value can be set in accordance with the variation in the motor shaft revolution speed. For example, even if the mechanical oil pump and the electrically driven oil pump are simultaneously actuated, the line pressure control valve can be controlled to the appropriate state and this can contribute on the improvement in the fuel consumption.

(4) Line pressure control section (AT controller) 7 sets each of the predetermined additive correction quantity, the first additive correction quantity, and the second additive correction quantity in accordance with working oil temperature Temp.

Therefore, the control valve command value can be set in accordance with the variation in the working oil temperature (Temp). For example, even if working oil temperature Temp is high so that an oil viscosity is accordingly low, the line pressure control valve can be controlled into an appropriate state and it can contribute on the improvement in the fuel consumption.

(5) Line pressure control section (AT controller) 7 sets each of the predetermined additive correction quantity, the first additive correction quantity, and the second additive correction quantity in accordance with the required line pressure.

Therefore, the control valve command value can be set in accordance with the required line pressure which varies in accordance with a traveling state of the vehicle. In addition, the line pressure characteristic of the line pressure control valve which is different according to the required line pressure is taken into consideration. Then, the line pressure control valve can appropriately be controlled and this appropriate control of the line pressure control valve can contribute on the improvement in the fuel consumption.

(6) Line pressure control section (AT controller) 7 stops electrically driven oil pump S-O/P and sets the first control valve command value (P. Reg regulated pressure) to control valve command value (solenoid command value), when the discharge pressure from mechanical oil pump M-O/P is in excess of the required line pressure.

Therefore, the improvement in the fuel consumption can be achieved while line pressure PL is not wastefully raised.

As described hereinabove, the control apparatus for the hybrid vehicle according to the present invention has been described on a basis of the preferred embodiment. However, the specific structure of the control apparatus for the hybrid vehicle according to the present invention is not limited to the preferred embodiment. Various design modifications and additions are allowed without departing from the scope of the present invention defined in each of the claims.

In the preferred embodiment, the map on the revolution correction quantity is prepared on a basis of data obtained on a basis of experiments and the revolution correction quantity is set using this map. However, the revolution correction quantity may be derived through a predetermined calculation.

In addition, in the preferred embodiment, second clutch CL2 is selected from among the frictional elements incorporated into stepped gear type transmission AT. However, second clutch CL2 may be installed independently of automatic transmission AT. For example, second clutch CL2 may be installed between motor/generator MG and transmission input shaft IN independently of automatic transmission AT. Or alternatively, second clutch CL2 may be installed between the output shaft of transmission AT and the driving wheels independently of automatic transmission AT.

In the preferred embodiment, stepped gear (automatic) transmission AT having the forward-seventh-speed-and-reverse-first-speed (automatic) transmission is used as the transmission. However, in the case of the stepped gear (automatic) transmission, the number of gear shift stages is not limited to this. The automatic transmission having the number of shift stages equal to or larger than second-speed gear shift stage may be used. In addition, a continuously variable transmission in which the transmission gear ratio is changed unlimitedly such as a belt type continuously variable transmission may be used as the transmission.

The preferred embodiment described above is the example in which the control apparatus is applied to the rear wheel drive (FR) vehicle. However, the present invention is applicable to a front wheel drive hybrid vehicle. In summary, the present invention is applicable to a hybrid vehicle in which both of mechanical oil pump and electrically driven oil pump are equipped and the supplied hydraulic pressure supplied from both of the oil pumps is drained through the single line pressure control valve so that the line pressure is controlled to the line pressure which is coincident with the command hydraulic pressure.

This application is based on a prior Japanese Patent Application No. 2010-245826 filed in Japan on Nov. 2, 2010. The entire contents of this Japanese Patent Application No. 2010-245826 are hereby incorporated by reference. Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus for a hybrid vehicle, comprising:
an engine;
a motor;
a hydraulic pressure clutch interposed between the engine and the motor to perform an engagement thereof and an opening thereof;
a transmission interposed between the motor and driving wheels to perform a change in at least one of a gear shift stage and a transmission gear ratio according to a hydraulic pressure;
a mechanical oil pump actuated by at least one of the engine and the motor to supply the hydraulic pressure;
an electrically driven oil pump actuated by a sub motor to supply hydraulic pressure;
a line pressure control valve disposed at a downstream side of each of the mechanical oil pump and the electrically driven oil pump to decrease the supplied hydraulic pressure from at least one of the mechanical oil pump and the electrically driven oil pump by opening drain ports thereof in accordance with a control valve command value; and
an AT controller having:
a sub motor control section configured to set a sub motor command value while the motor is operating on a basis of a required line pressure, the required line pressure being calculated from a clutch holding required pressure and a lowest line pressure at which a first clutch of the hydraulic pressure clutch opens, and
a line pressure control section configured to:
set the control valve command value by adding, to the required line pressure, a predetermined additive correction quantity so as to counteract mechanical dispersion of the line pressure control valve, and
control the drain ports of the line pressure control valve to a closure side during actuation of the electrically driven oil pump.

2. The control apparatus for the hybrid vehicle as claimed in claim 1, wherein the line pressure control section comprises:
a first line pressure control section configured to set a first control valve command value by adding a first additive correction quantity which decreases at a predetermined rate along with an increase in a motor shall revolution speed to the required line pressure; and
a second line pressure control section configured to set a second control valve command value by adding a second additive correction quantity, which is larger than the first additive correction quantity when the motor shaft revolution speed is lower than a predetermined revolution speed and decreases at a rate larger than the predetermined rate of decrease in the first additive correction quantity along with the increase in the motor shaft revolution speed when the motor shaft revolution speed has reached another predetermined revolution speed, to the required line pressure, and
wherein, when a discharge pressure from the mechanical oil pump is equal to or lower than the required line pressure, the line pressure control section actuates the electrically driven oil pump and sets the control valve command value according to a select high between the first control valve command value and the second control valve command value.

3. The control apparatus for the hybrid vehicle as claimed in claim 1, wherein the line pressure control section sets the predetermined additive correction quantity in accordance with a motor shaft revolution speed.

4. The control apparatus for the hybrid vehicle as claimed in claim 1, wherein the line pressure control section sets the predetermined additive correction quantity in accordance with a working oil temperature.

5. The control apparatus for the hybrid vehicle as claimed in claim 1, wherein the line pressure control section sets the predetermined additive correction quantity in accordance with the required line pressure.

6. The control apparatus for the hybrid vehicle as claimed in claim 2, wherein the line pressure control section sets each of the first and second additive correction quantities in accordance with the motor shaft revolution speed.

7. The control apparatus for the hybrid vehicle as claimed in claim 2, wherein the line pressure control section sets each of the first and second additive correction quantities in accordance with a working oil temperature.

8. The control apparatus for the hybrid vehicle as claimed in claim 2, wherein the line pressure control section sets each of the first and second additive correction quantities in accordance with the required line pressure.

9. The control apparatus for the hybrid vehicle as claimed in claim 2, wherein the line pressure control section stops the electrically driven oil pump and sets the first control valve command value to the control valve command value, when the discharge pressure from the mechanical oil pump is in excess of the required line pressure.

10. A control method for a hybrid vehicle, the hybrid vehicle comprising:
an engine;
a motor;
a hydraulic pressure clutch interposed between the engine and the motor to perform an engagement thereof and an opening thereof;
a transmission interposed between the motor and driving wheels to perform a change in at least one of a gear shift stage and a transmission gear ratio according to a hydraulic pressure;
a mechanical oil pump actuated by at least one of the engine and the motor to supply the hydraulic pressure; and
an electrically driven oil pump actuated by a sub motor to supply the hydraulic pressure, the control method comprising:
providing a line pressure control valve disposed at a downstream side of each of the mechanical oil pump and the electrically driven oil pump to decrease the supplied hydraulic pressure from at least one of the mechanical oil pump and the electrically driven oil pump by opening drain ports thereof in accordance with a control valve command value;
setting a sub motor command value while the motor is operating on a basis of a required line pressure calculated from a clutch holding required pressure and a lowest line pressure at which a first clutch of the hydraulic pressure clutch opens;
setting the control valve command value by adding, to the required line pressure, a predetermined additive correction quantity so as to counteract mechanical dispersion of the line pressure control valve; and controlling the drain ports of the line pressure control valve to a closure side via an AT controller during actuation of the electrically driven oil pump.

* * * * *